(12) United States Patent  (10) Patent No.: US 7,984,591 B2
Cashin et al.  (45) Date of Patent: Jul. 26, 2011

(54) IMPACT RESISTANT SHEET MATERIAL

(75) Inventors: Arthur Henry Cashin, Nashville, TN (US); Imad Mohammed Qashou, Nashville, TN (US)

(73) Assignee: Fiberweb, Inc., Old Hickory, TN (US)

( * ) Notice: Subject to any disclaimer, the term of this patent is extended or adjusted under 35 U.S.C. 154(b) by 57 days.

(21) Appl. No.: 11/837,100

(22) Filed: Aug. 10, 2007

(65) Prior Publication Data

US 2009/0042471 A1    Feb. 12, 2009

(51) Int. Cl.
*E04B 1/12* (2006.01)

(52) U.S. Cl. .................. 52/63; 52/106; 52/202; 52/408; 52/506.1

(58) Field of Classification Search .............. 52/63, 106, 52/202, 408, 506.1; 442/182, 328
See application file for complete search history.

(56) References Cited

U.S. PATENT DOCUMENTS

| | | | |
|---|---|---|---|
| 3,081,519 A | | 3/1963 | Blades et al. |
| 4,843,788 A | * | 7/1989 | Gavin et al. ...................... 52/205 |
| 4,929,303 A | | 5/1990 | Sheth |
| 5,537,786 A | | 7/1996 | Lozier et al. |
| 5,656,167 A | | 8/1997 | Martz |
| 5,733,824 A | | 3/1998 | Brunka et al. |
| 5,863,639 A | | 1/1999 | Franke et al. |
| 5,865,926 A | | 2/1999 | Wu et al. |
| 6,046,118 A | | 4/2000 | Jones et al. |
| 6,071,834 A | * | 6/2000 | Martz ............................. 442/51 |
| 6,089,300 A | | 7/2000 | Woodside et al. |
| 6,100,208 A | | 8/2000 | Brown et al. |
| 6,119,422 A | * | 9/2000 | Clear et al. .................... 52/309.8 |
| 6,187,696 B1 | | 2/2001 | Lim et al. |
| 6,274,520 B1 | | 8/2001 | Cordell |
| 6,355,333 B1 | * | 3/2002 | Waggoner et al. ............ 428/174 |
| 6,410,465 B1 | | 6/2002 | Lim et al. |

(Continued)

FOREIGN PATENT DOCUMENTS

EP    0 309 073 A2    3/1989

(Continued)

OTHER PUBLICATIONS

*Detailing Rain-Screen Siding*, G. Katz et al., JLC, Mar. 2006, pp. 99-104.

(Continued)

*Primary Examiner* — Brian E Glessner
*Assistant Examiner* — Patrick Maestri
(74) *Attorney, Agent, or Firm* — Alston & Bird LLP

(57) ABSTRACT

The present invention provides an impact resistant sheet material that helps provide exterior walls of a building with resistance to impacts so that the building structure can meet building standards, such as the Miami-Dade County Large Missile Impact Test, for resisting impacts in high wind areas. In one embodiment, sheet material comprises an impact resistant layer that attached to fibrous substrate. The impact resistant layer provides impact resistance to the sheet material so that a wall structure employing the sheet material is able to successfully withstand an impact from a projectile comprising a 9 pound, 7 foot two-by-four ("2×4") traveling at a speed of at least 34 miles per hour. The impact resistant sheet material may comprise a moisture vapor permeable, water-impermeable barrier layer having a hydrohead of at least 55 cm and a moisture vapor transmission rate of at least 35 $g/m^2/day$. Such a sheet material is particularly useful in barrier applications, such as a house wrap.

40 Claims, 10 Drawing Sheets

U.S. PATENT DOCUMENTS

| | | | |
|---|---|---|---|
| 6,506,695 | B2 | 1/2003 | Gardner et al. |
| 6,602,809 | B1 | 8/2003 | Cabrey |
| 6,696,120 | B1 | 2/2004 | Todt |
| 6,706,225 | B2 | 3/2004 | Cabrey |
| 6,901,712 | B2 | 6/2005 | Lionel |
| 7,148,160 | B2 | 12/2006 | Porter |
| 2002/0106959 | A1 | 8/2002 | Huffines et al. |
| 2002/0132547 | A1 | 9/2002 | Grondin et al. |
| 2003/0114055 | A1* | 6/2003 | Burton et al. .............. 442/31 |
| 2004/0016502 | A1 | 1/2004 | Jones |
| 2004/0023585 | A1 | 2/2004 | Carroll et al. |
| 2004/0029469 | A1* | 2/2004 | Anderson et al. ............ 442/77 |
| 2004/0214489 | A1 | 10/2004 | Porter |
| 2005/0124240 | A1 | 6/2005 | Porter |
| 2005/0176331 | A1 | 8/2005 | Martin et al. |
| 2005/0227086 | A1 | 10/2005 | Murphy |
| 2006/0019568 | A1 | 1/2006 | Toas et al. |
| 2006/0228963 | A1 | 10/2006 | Souther et al. |
| 2006/0281379 | A1* | 12/2006 | Haas et al. .............. 442/36 |

FOREIGN PATENT DOCUMENTS

| | | |
|---|---|---|
| EP | 0 788 873 A1 | 8/1997 |
| EP | 1 400 348 A2 | 3/2004 |
| WO | WO 92/09429 A1 | 6/1992 |
| WO | WO 94/14607 A1 | 7/1994 |
| WO | WO 98/40581 A1 | 9/1998 |
| WO | WO 02/103099 A1 | 12/2002 |
| WO | WO 2005/030860 A1 | 4/2005 |
| WO | WO 2006/080907 A1 | 8/2006 |

OTHER PUBLICATIONS

*GreenGuardA® RainDropA® Housewrap*, available at https://pactivnet.pactive.com/ProductCatalog/Rooms/DisplayPages/LayoutInitial?ProductC..., (Apr. 26, 2007), 2 pages.

*GreenGuardA® Plygood-Ultra Sheathing*, available at https://pactivnet.pactive.com/ProductCatalog/Rooms/DisplayPages/LayoutInitial?ProductC..., (Apr. 26, 2007), 2 pages.

*Industrial Fabrics; Woven, Nonwoven and Knitted Textiles*, Baycor Products, 19 pages.

*History and Physical Chemistry of HDPE*, L. H. Gabriel, Chapter 1, 17 pages.

*Plastics Packaging; Properties, Processing, Applications, and Regulations*, R. J. Hernandez et al., Hanser Gardner Publications, Inc., Cincinnati, pp. 55-62.

* cited by examiner

IMPACT RESISTANT SHEET MATERIAL

FIELD OF THE INVENTION

The present invention relates generally to a sheet material and in particular to an impact resistant sheet material.

BACKGROUND OF THE INVENTION

In regions that are susceptible to high winds, such as hurricane force winds, there is a strong desire and need to protect buildings from impacts resulting from wind-borne debris. For example, the state of Florida has set standards that buildings situated in High Velocity Hurricane Zones (e.g., Miami-Dade and Broward Counties) must be provided with protection against wind-borne debris caused by hurricanes. In particular, Miami-Dade County has implemented strict test protocols for wind-borne debris that require walls and building panels to withstand certain impacts, such as large or small-missile impacts. A product is declared large-missile resistant if it can withstand various impacts with a piece of lumber weighing approximately 9 pounds, measuring two-by-four in size ("2× 4"), and traveling at a speed of 50 feet per second (34 mph). Products that are able to meet the Miami-Dade County test protocols are issued a Miami-Dade County Notice of Acceptance (NOA).

Various types of sheet materials have been used in the construction of buildings as a barrier fabric to block water and air while allowing transmission of moisture vapor from the building interior. These so-called housewrap products are typically applied over the sheathing layer of the building and beneath the exterior surface layer of brick or siding. Generally, housewrap products are flexible, inexpensive, and relatively easy to install. However, they typically offer little to no impact resistance and are susceptible to being punctured or torn. As a result, these products are unable to meet the Miami-Dade County requirements for impact resistance.

To meet the Miami-Dade County impact-resistant requirements, various products have been developed, such as steel or cementitious wall panels. For example, Miami-Dade County NOA No. 02-1216.01 describes an approved impact resistant wall panel comprising rib roll-formed galvanized steel that is made by Reynolds Metal Co. This product is generally expensive to produce and install, as well as being relatively heavy and cumbersome. Other commercially available products have been developed that are directed to composite structures that include one or more cementitious layers, a foam core, and a reinforcing mesh. For example, U.S. Pat. No. 6,119,422 describes a multilayered impact resistant building panel having an insulating foam core that is sandwiched between a fiberglass mesh reinforced cementitious panel and a plywood sheet, and an impact resistant heavy and thick nylon mesh adhered between the cementitious panel and the foam core. These wall panels are also expensive to produce and difficult to install.

Thus, there still exists a need for a product that can meet the Miami-Dade County impact-resistant requirements while being relatively inexpensive and easy to install.

BRIEF SUMMARY OF THE INVENTION

The present invention provides an impact resistant sheet material that can help provide a building structure, such as an exterior wall or panel, with resistance to exterior impacts so that the building structure can meet building standards, such as the Miami-Dade County Large Missile Impact Test, for resisting impacts in high wind areas.

In one embodiment, the impact resistant sheet material comprises an impact resistant layer that is attached to a fibrous substrate. The impact resistant layer provides impact resistance to the sheet material so that the sheet material is able to successfully withstand an impact from a projectile comprising a 9 pound, 7 foot two-by-four piece ("2×4") of lumber traveling at a speed of at least 34 miles per hour without penetration of the sheet material. In one embodiment, the impact resistant sheet material of the present invention has a puncture strength of about 1500 to 7,500 psi; an Impact Resistance as measured by the Free-Falling Dart Method of greater than about 0.7 pounds; and a Mullen burst strength of about 175 pounds (lbs) or greater.

In some embodiments, the impact resistant layer comprises at least two pluralities of strands that extend in different directions and that intersect and are bonded to each other at points of contact. In one embodiment, the impact resistant layer includes a first plurality of strands that extend in a first direction, a second plurality of strands that extend in a second direction that is different than the first direction, and third and fourth pluralities of strands that both extend at an angle with respect to the first plurality of strands and are oriented at opposite angles with respect to each other so they intersect each other in an X-like pattern. Preferably, the impact resistant layer has a tensile strength of at least 445 Newtons and an elongation that is between 2 and 20 percent to thereby provide impact resistance to the sheet material so that the sheet material is able to successfully withstand impacts from wind-borne debris.

In one particular embodiment, the present invention is directed to an impact resistant sheet material having a breathable barrier layer. For example, the impact resistant sheet material may comprise a moisture vapor permeable, air and water-impermeable barrier layer having a hydrohead of at least 55 cm and a moisture vapor transmission rate of at least 35 g/m$^2$/day. Such a sheet material is particularly useful in barrier applications, such as a housewrap.

In one embodiment, the barrier layer comprises a breathable barrier film that is attached to a surface of a fibrous substrate, such as spunbond webs, woven slit films, carded webs, meltblown webs, flashspun webs, woven, and extruded webs, and the like. Preferably, the barrier layer comprises a nonwoven substrate comprising polymeric fibers randomly disposed and bonded to one another, and a microporous polymeric film layer overlying one surface of the nonwoven substrate and intimately bonded thereto. In one particular embodiment, the film layer can comprise a polyolefin that is extrusion-coated onto a nonwoven substrate comprised of substantially continuous spunbond polypropylene filaments.

In another embodiment, the present invention is directed to a safe room that can be used in a building structure to provide shelter to occupants during high wind storm so that the occupants can be sheltered from wind-borne debris. For example, the safe room may comprise a room disposed in a building structure that has a plurality of walls that are substantially covered with the impact resistant sheet material so that wind-borne debris is prevented from penetrating through the walls of the safe room and striking the occupants therein.

In addition to providing the desired impact resistance, the impact resistant sheet material of the present invention can be designed to be lightweight, flexible, and in some embodiments is able to be cut with conventional cutting instruments, such as a scissors. As a result, the sheet material can be used in a wide variety of applications and can be relatively easily installed to exterior walls in the same way that traditional housewrap materials are applied. Further, it is unexpected that the use of the relatively lightweight and flexible sheet material of the present invention is able to meet the requirements of the Miami-Dade County Large Missile Impact Test. This is particularly true because conventional materials utilized in such applications typically provide impact resistance through rigidity and harness (e.g., corrugated steel sheeting or concrete/cinder block).

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 8:
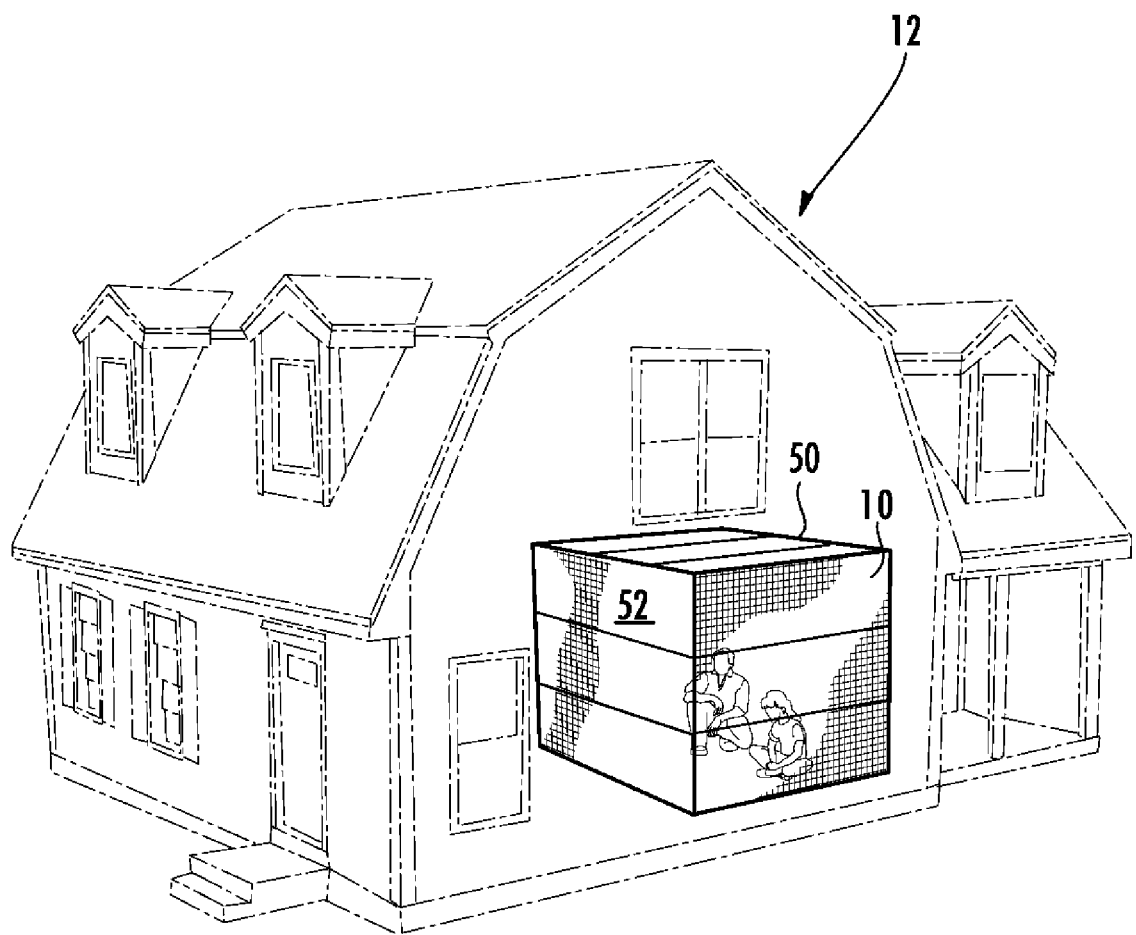
Figure 9:
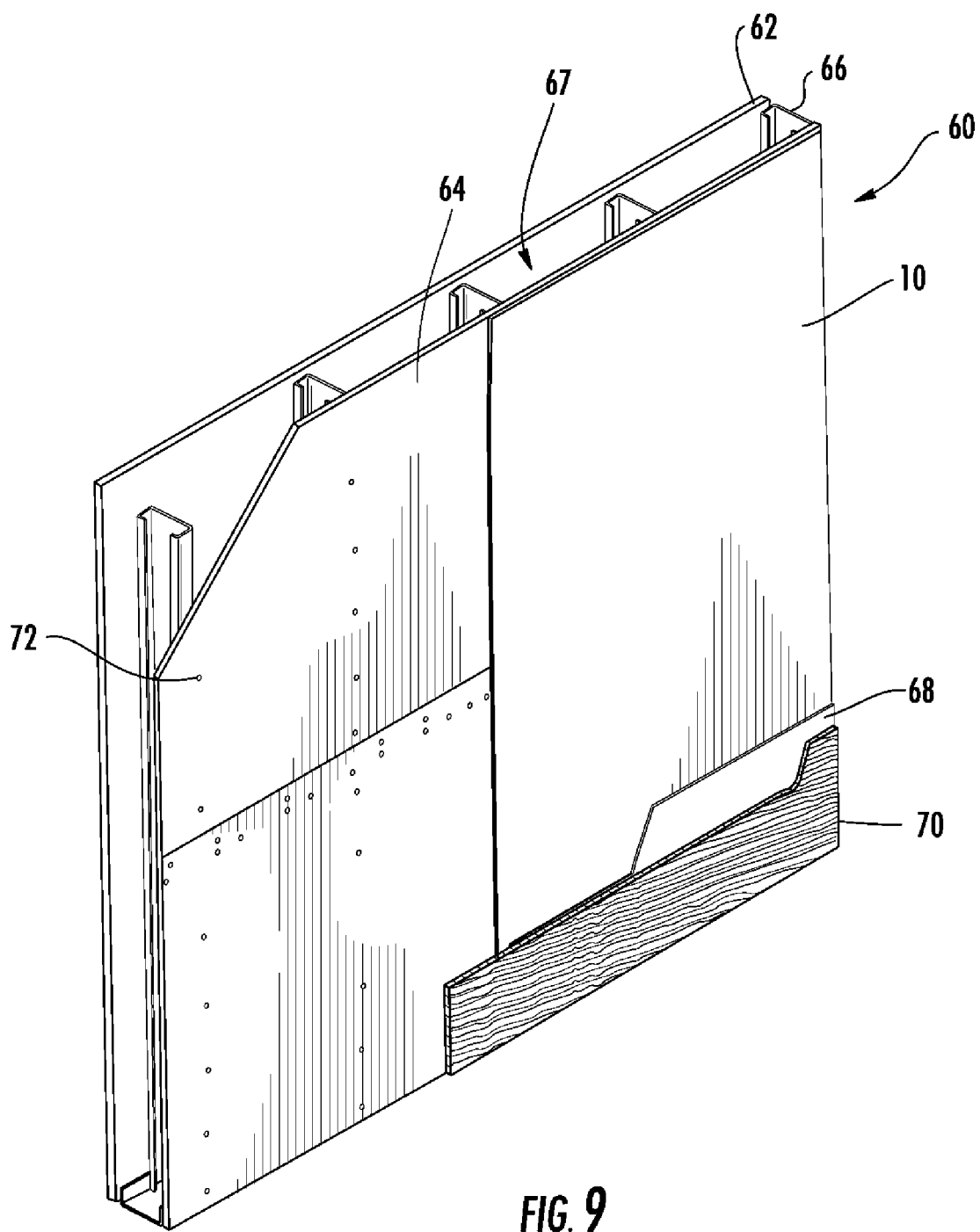

FIG. 8 is a perspective view of a building in which the exterior walls of the building are in ghost form to reveal an interior safe room that is protected with an embodiment of the impact resistant sheet material; and FIG. 9 is a perspective view of a wall panel that includes the impact resistant sheet material of the present invention and that was tested in accordance with the Miami-Dade County Impact Resistance test protocols.

DETAILED DESCRIPTION OF THE INVENTION

The present invention now will be described more fully hereinafter with reference to the accompanying drawings, in which some, but not all embodiments of the invention is shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention provides an impact resistant sheet material that can help protect structures, such as buildings, from damage that may result from impacts with wind-borne debris moving at relatively high rates of speed. In one embodiment, the impact resistant sheet material can help provide a building structure, such as an exterior wall or panel, with resistance to exterior impacts so that the building structure can meet building standards, such as the Miami-Dade County Large Missile Impact Test, for resisting impact in high wind areas. Under the Miami-Dade County Large Missile Impact Test, a building structure, such as a wall or panel, must be resistant to penetration from the impact on the exterior side of the panel of a wooden two-by-four ("2x4"), approximately eight feet long, weighing about 9 pounds and moving endwise at 34 miles per hour. In order to pass the Missile Impact Test, the panel structure subjected to such an impact must be able to withstand a cyclic pressure differential test in which a vacuum pressure is applied to the panel structure before and after the panel has sustained an impact from the test projectile. Under the cyclic pressure differential test, the wall panel must withstand at least one-third of the total vacuum pressure applied to the panel prior to the impact without failure. Specifics of the Miami-Dade County Large Impact Missile Test are discussed in greater detail below.

Figure 1:
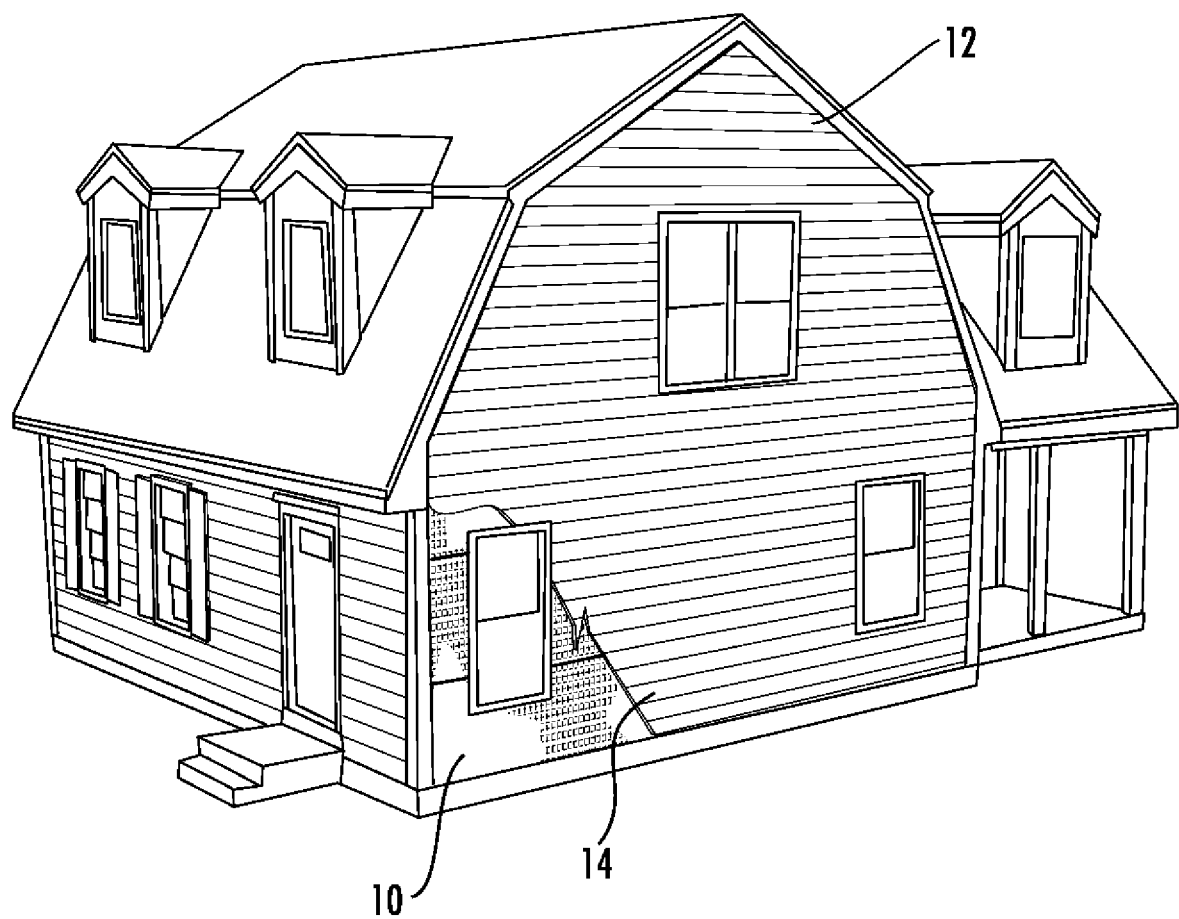
FIG. 1 is a perspective view of a house that includes the impact resistant sheet material of the present invention and in which a portion of the siding has been removed to show the underlying impact resistant sheet material.

FIG. 1 illustrates an embodiment of the present invention wherein the impact resistant sheet material 10 is being utilized as a housewrap that is attached to the exterior wall sheathing of a building 12 (e.g., a house). In the illustrated embodiment, a portion of the building's exterior siding 14 has been removed to provide the reader with a view of the impact resistant sheet material 10. As discussed in greater detail below, the impact resistant sheet material is capable of absorbing impacts from objects moving at relatively high rates of speed without penetration. As a result, the impact resistant sheet material of the present invention helps prevent such objects from penetrating through the exterior walls of the building and entering into the building's interior space.

Figure 2A:
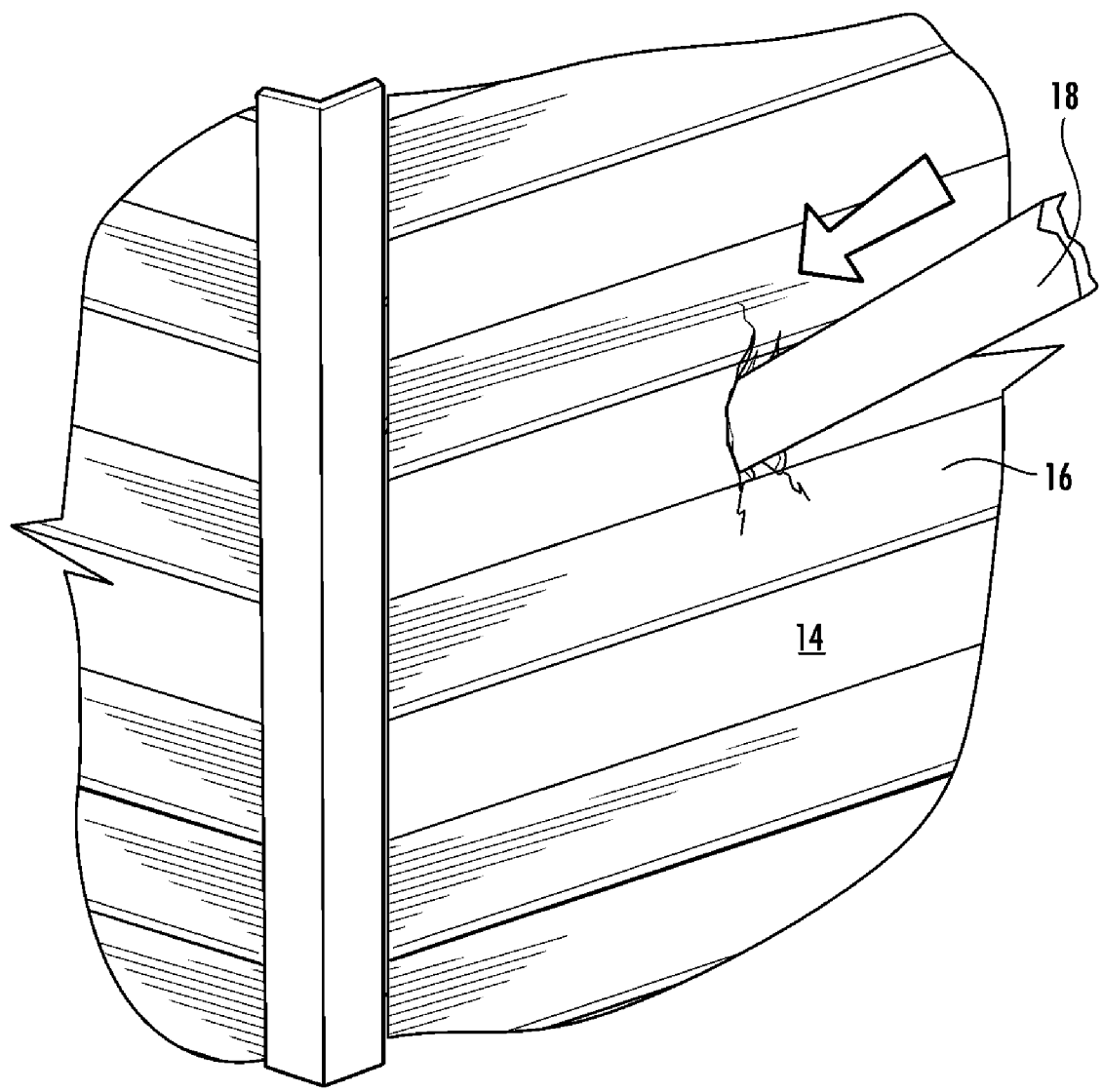
FIG. 2A illustrates a projectile impacting an exterior wall of a building that does not include the impact resistant sheet material.
Figure 2B:
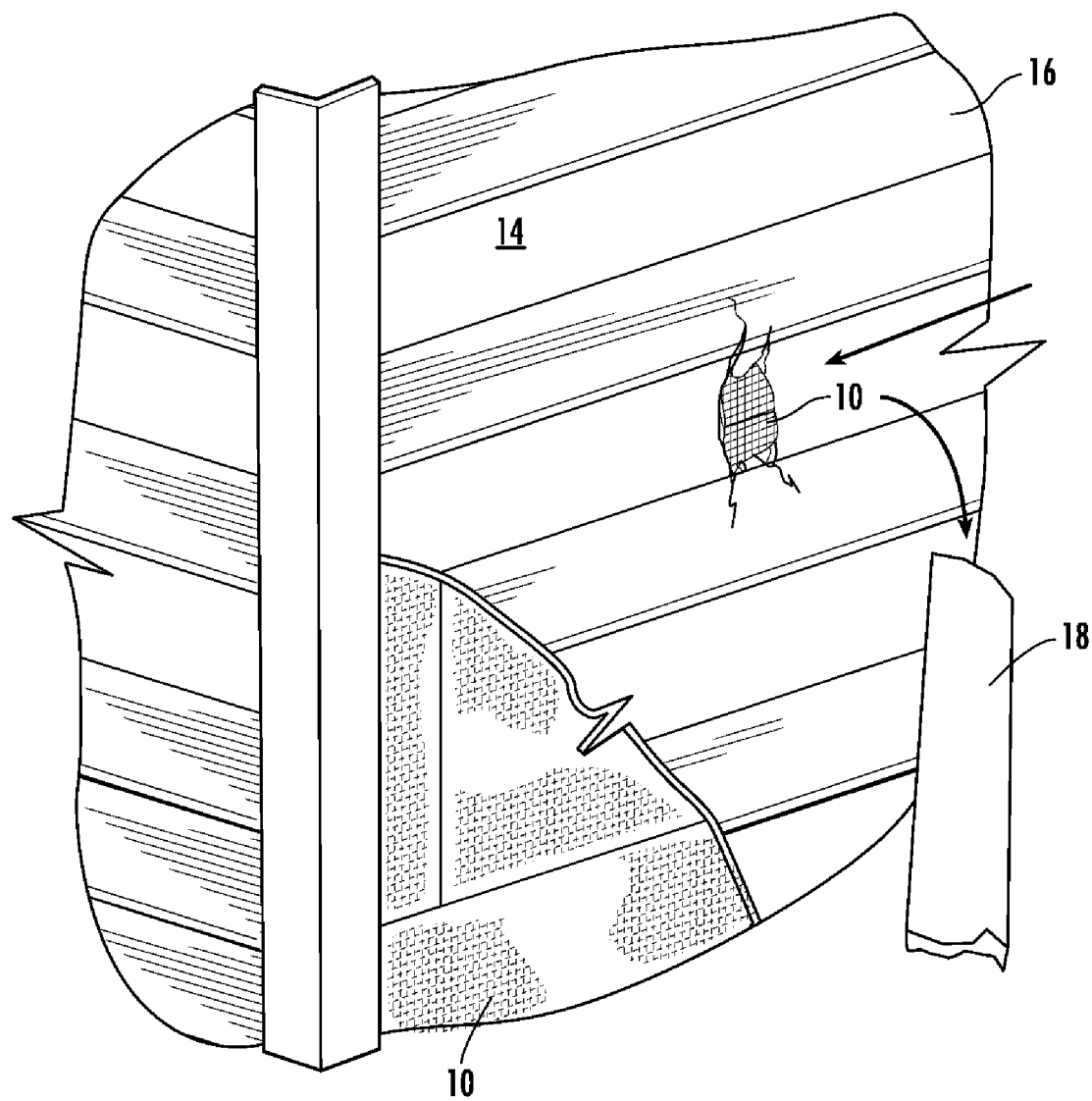
FIG. 2B illustrates a projectile impacting an exterior wall of a building that does include the impact resistant sheet material.

FIGS. 2A and 2B illustrate two similarly constructed exterior wall structures with the exception that the exterior wall depicted in FIG. 2A does not include the impact resistant sheet material, whereas the exterior wall of FIG. 2B does include the impact resistant sheet material of the present invention. In FIG. 2A, the exterior wall 16 of a building is in the process of being impacted by a wind-borne object 18, for example a piece of lumber, that is moving at a relatively high rate of speed. As shown in FIG. 2A, the exterior siding 14 of the building and the underlying structure offers little to no impact resistant to the object. As a result, winds of sufficient strength can propel the object through the outer exterior wall 16 of the building, which can result in the object penetrating into the building's interior. As shown in FIG. 2B, an exterior wall 16 that includes the impact resistant sheet material 10 provides impact resistance to the exterior wall and helps prevent the object 18 from penetrating through the exterior wall and into the building. Although the force of the impact may damage some portions of the exterior wall, such as the siding 14 or stucco, the impact resistant sheet material has absorbed much of the impact and has prevented the object from penetrating through exterior wall of the building. As a result, a wall structure employing the impact resistant sheet material of the present invention is capable of meeting the requirements of the Miami-Dade County Large Missile Impact Test and is particularly useful in regions that are susceptible to high winds.

Figure 3:
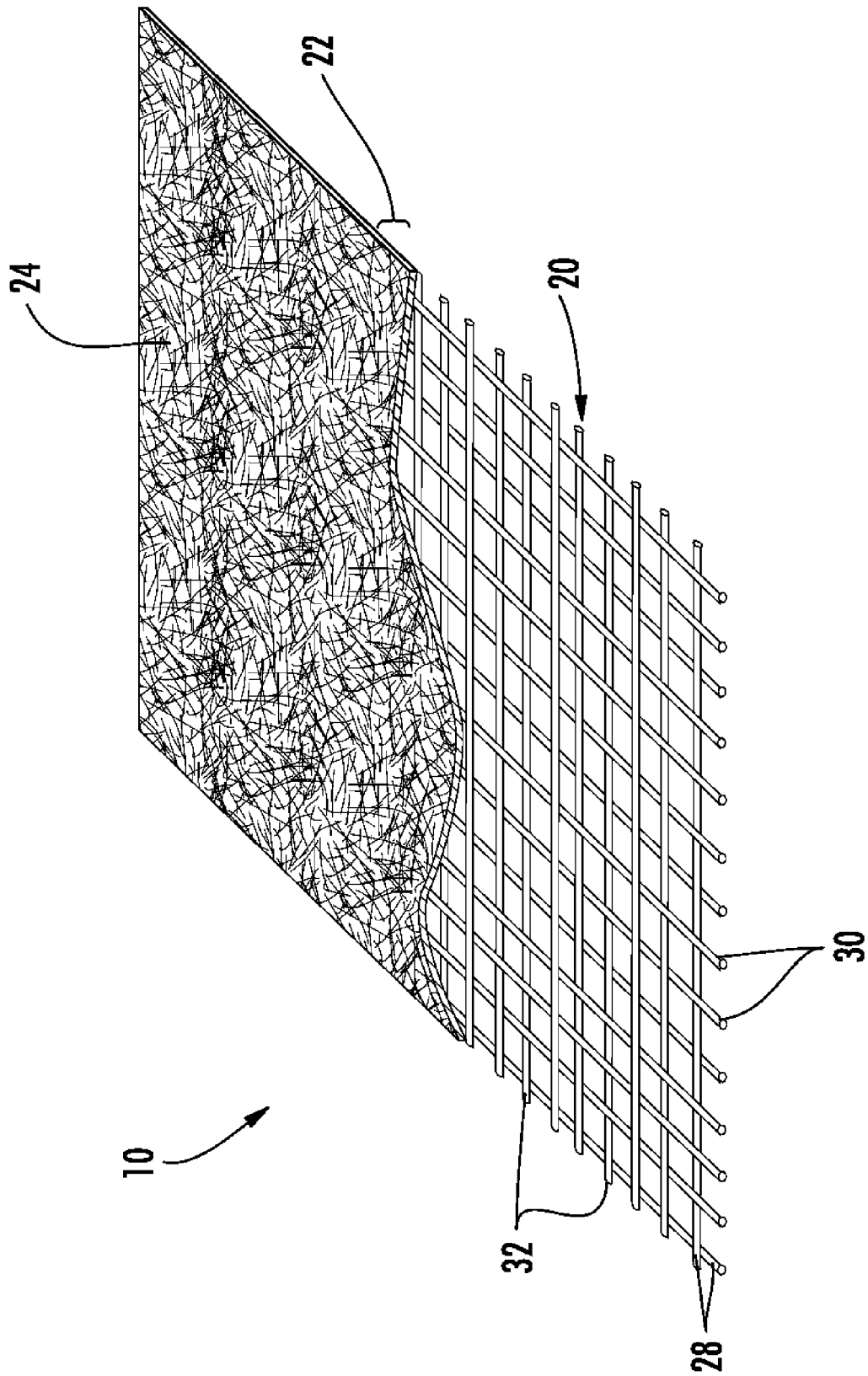
FIG. 3 is a perspective view of an embodiment of the impact resistant sheet material in which the impact resistant sheet material includes a fibrous layer to which an impact resistant layer has been attached.
Figure 4:
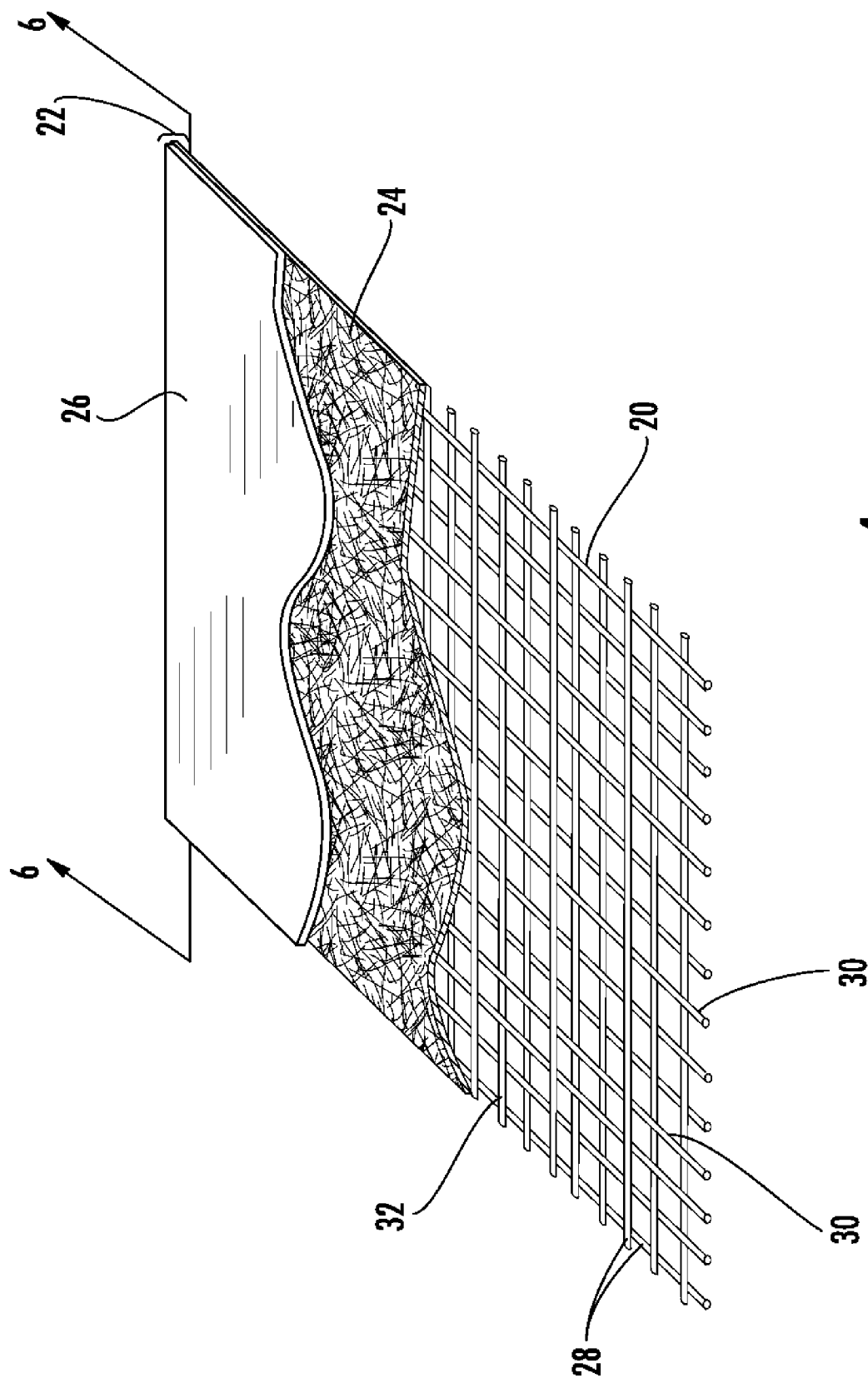
FIG. 4 is a perspective view of an embodiment of the impact resistant sheet material in which the impact resistant layer comprises a plurality of intersecting and interwoven strands that are arranged perpendicular to each other to form a grid-like pattern.
Figure 5:
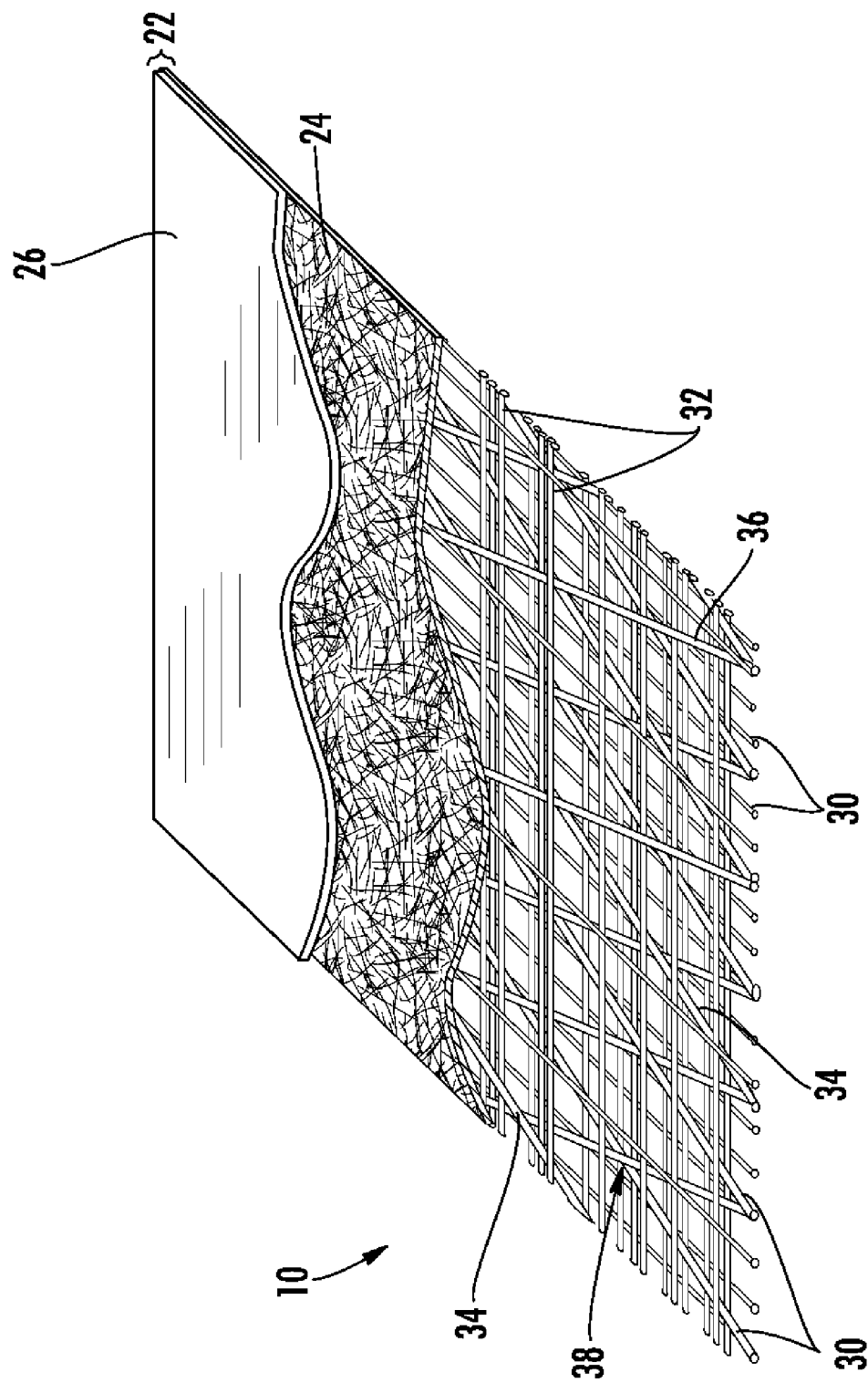
FIG. 5 is a perspective view of an embodiment of the impact resistant sheet material in which the impact resistant layer comprises a plurality of intersecting and interwoven strands having a tri-axial pattern.

In housewrap and similar applications, it is generally desirable for the impact resistant sheet material to be both vapor permeable and water impermeable while also providing a barrier to air infiltration. In this regard, FIG. 3 illustrates an embodiment of the impact resistant sheet material 10 in which the impact resistant sheet material includes an impact resistant layer 20 to which a barrier layer 22 is attached. The impact resistant layer 20 helps provide impact absorbing properties so that the impact resistant sheet material 10 can sustain impacts from objects moving at relatively high speeds without rupture. As discussed in greater detail below, the barrier layer 22 may comprise a fibrous substrate 24 that is moisture vapor permeable and impermeable to water and air leakage. In some embodiments, the fibrous substrate may be coated with a breathable, liquid impermeable coating, such as a film layer. In other embodiments, the barrier layer may comprise a combination of a fibrous substrate and a breathable, water-impermeable film layer. For example, FIGS. 4 and 5 illustrate embodiments of the invention in which the impact resistant sheet material 10 includes a fibrous substrate 24 having an outer moisture vapor permeable, water-impermeable film layer 26 adhered on one side thereof and the impact resistant layer 20 attached to the opposite side. In still other embodiments, the impact resistant sheet material may be used without a barrier layer. These and other embodiments of the invention are discussed in greater detail below.

Generally speaking, the breathability of the impact resistant sheet material may be controlled as desired for the intended application of the materials. In barrier applications, such as a housewrap, it is generally desirable that the impact resistant sheet material has a moisture vapor transmission rate (MVTR) that is at least 35 g/m$^2$/day at 50% relative humidity and 23° C. (73° F.) (e.g., perm of 5 or greater), and more desirably an MVTR of at least 50. In one embodiment, the impact resistant sheet material has a MVTR that is at least 100 g/m$^2$/day. In some embodiments, the impact resistant sheet material may have a MVTR of greater than about 150 g/m$^2$/day, more specifically greater than about 300 g/m$^2$/day, and even more specifically greater than about 500 g/m$^2$/day. Typically, housewrap applications do not require high moisture vapor transmission rates and will often have a moisture vapor transmission rate of less than about 2000 g/m$^2$/day. It should be understood however that materials having higher moisture vapor transmission rates are equally within the scope of the invention. In barrier applications it is also desirable for the impact resistant sheet material to be impermeable to air flow. Preferably, the impact resistant sheet material has an Air Leakage Rate less than 0.02 L/(s·m$^2$), and more desirably less than 0.015 L/(s·m$^2$). Moisture vapor transmission and Air Leakage rates are measured in accordance with the test procedures described below under the section entitled "Test Methods."

In some embodiments, the impact resistant sheet material preferably also has a Gurley porosity of at least 400 seconds and a hydrostatic head of at least 55 cm. Gurley porosity and hydrostatic head are measured in accordance with the test procedures described below under the section entitled "Test Methods."

As discussed above, the impact resistant layer 20 provides sufficient impact absorbing performance so that the impact resistant sheet material 10 is able to meet the requirements of the Miami-Dade Large Missile Impact Test. Preferably, the impact resistant sheet material is able to withstand an impact of a two-by-four ("2=4") piece of lumber weighing approximately 9 pounds, traveling at a speed of 50 feet per second (34 mph). For example, the impact resistant sheet material 10 is desirably capable of sustaining an impact energy from a projectile, such as a two-by-four ("2=4"), of at least 65 ft-lbs/sec/in$^2$ without permitting the projectile to penetrate through the impact resistant sheet material.

Preferably, the impact resistant sheet material of the present invention has a puncture strength of about 1,500 to 7,500 psi, and in particular from about 2,000 to 6,000 psi, and more particularly from about 3,000 to 5,000 psi. In some embodiments, the impact resistant sheet material has an Impact Resistance as measured by the Free-Falling Dart Method of greater than 0.7 lbs, such as greater than 1 lb. and in particular greater than about 2 lbs. In one particular embodiment, the impact resistant sheet material has an impact resistance of at least 1 to 5 lbs, and more particularly, from about 2 to 4 lbs. The impact resistant sheet material of the present invention may also have Mullen burst strength of at least 100 lbs, and in particular greater than 300 lbs. or greater than 500 lbs. Preferably, the impact resistance sheet material has a Mullen burst strength from about 100 to 750 lbs., and more preferably from about 300 to 550lbs. Impact Resistance according to the Free-Falling Dart Method, puncture resistance, and Mullen burst strength are measured in accordance with the test procedures described below under the section entitled "Test Methods."

As shown in FIGS. 3-5, the impact resistant layer 20 may comprise a plurality of intersecting strands (collectively referred to by reference number 28) that extend across a surface of the fibrous substrate and are attached to each other at points of contact. In one embodiment, the impact resistant layer 20 comprises a plurality of substantially parallel strands that extend substantially in a first direction and a second plurality of substantially parallel strands extending in a second and different direction. As a result, the first and second strands are woven or attached to each other at multiple points of contact to thereby form a strong and coherent scrim-like material. In some embodiments, the plurality of strands can be adhesively or thermally bonded to each other. In one preferred embodiment, the first and second pluralities of strands are woven together to provide strength and integrity to the impact resistant layer 20.

In the embodiments illustrated in FIGS. 3 and 4, the impact resistant layer 20 comprises a first plurality of spaced apart parallel strands 30 extending in a vertical direction (e.g. the machine or longitudinal direction), and a second plurality of spaced-apart parallel strands 32 extending in a horizontal direction (e.g. the cross or transverse direction) that are substantially perpendicular to each other, and thereby define a woven scrim layer having a grid-like pattern. Collectively, strands 28 intersect with one another and are bonded to each other to form a strong and coherent scrim-like material that is capable withstanding impacts from objects moving at relatively high rates of speed.

In an alternative embodiment, as shown in FIG. 5, the impact resistant layer 20 may have a weave pattern in which the impact resistant layer includes three or more pluralities of strands that are arranged and extend in three or more different directions with respect to each other. In the embodiment in FIG. 5, the impact resistant layer includes a first plurality of strands 30 that extend in the vertical direction (e.g., machine direction), a second plurality of strands 32 that extend in the horizontal (e.g. cross direction) and two pluralities of strands 34, 36 that both extend at an angle with respect to strands 30 and are oriented at opposite angles with respect to each other so they intersect with each other in an X-like pattern 38. Pluralities of strands 34, 36 may be interwoven with strands 30, 32 and each other so as to form a strongly woven scrim material having high strength and low elongation.

In another embodiment, the impact resistant layer may have a triaxial weave pattern in which a first plurality of substantially parallel strands extend in the longitudinal direction of the sheet material, a second plurality of substantially parallel strands extend at an angle with respect to the first plurality of strands that is between 45 and 85 degrees, and a third plurality of substantially parallel strands extend at an angle with respect to the first plurality of strands that is between 95 and 135 degrees. The second and third pluralities of strands typically extend at opposite angles with respect to each other so that the strands intersect each other to form an X-like pattern.

In yet another embodiment, the impact resistant layer comprises a first plurality of substantially parallel strands that extend in the longitudinal direction of the sheet material, a second plurality of substantially parallel strands and a third plurality of substantially parallel strands that extend at opposite angles with respect to each other and intersect each other to form an X-like pattern. In one embodiment, the second plurality of strands extends at an angle with respect to the first plurality of strands that is between 75 and 85 degrees, and a third plurality of substantially parallel strands extend at an angle with respect to the first plurality of strands that is between 95 and 105 degrees. In some embodiments, the impact resistant layer may include a second set of intersecting strands that extend at different angles with respect to the first plurality of strands than the second and third plurality of strands to thereby define an impact resistant layer having two X-like patterns of strands that are of different size with respect to each other.

Other weaving patterns or numbers of strands may be employed in the practice of the invention provided the resulting impact resistant layer has sufficient impact resistance so that a wall structure employing the impact resistant sheet material is capable of passing the Miami-Dade County Large Missile Impact Test. The number of strands per square inch may range from about 5 to 50 strands per square inch, such as from 5 to 40, 5 to 30, and 10 to 25 strands per square inch. For example, in the embodiment illustrated in FIGS. 3 and 4, the numbers of strands per square inch may range from about 10 to 30, and desirably from about 15 to 25, and more desirably from about 17-20. In the embodiment illustrated in FIG. 5, the number of strands per square inch may range from about 5 to 20, and in particular from about 5 to 15, and more particularly, from about 7 to 10 strands per square inch. The strands generally have a denier between about 500 and 1,500, with a denier of about 800 to 1,200 being somewhat more preferred.

In order to provide the desired impact resistance, it is generally important that the strands comprising the impact resistant layer, and hence the impact resistant layer itself, have low elongation and high tenacity. Generally, it is desirable that the impact resistant layer has low elongation in the cross and/or machine directions so that elongation of the impact resistant layer is maintained at a minimum level during an impact. For example, in some cases having a higher level of elongation may permit an object impacting the impact resistant sheet material to pass through, or at least partially through, a building structure before the impact resistant layer is able to sufficiently retard the object's forward movement. It may also be desirable that the impact resistant layer has at least some elongation in the machine and cross directions so that upon being impacted by an object moving at a relatively high rate of speed, the impact resistant layer has some slight give due to the impact. This slight give (elongation) allows energy from the impact to be distributed into the surrounding regions of the impact resistant layer so that the total force of the impact is not localized only at the site of impact. As a result, impact energies can be distributed into surrounding regions of the impact resistant layer, which may help prevent breakage of the impact resistant layer.

Generally, the desired amount of elongation will depend on the tenacity and number of strands in the area of impact. For example, strands having a relatively higher tenacity are able to absorb greater impacts than strands having a lower tenacity. In one embodiment, the impact resistant layer has an elongation that is at least 1%, and preferably greater than 2%, 3%, 4%, 5% or more. In one particular embodiment, the impact resistant layer has an elongation in the machine and cross directions that is between about 2 and 20%, and desirably between 5 and 15%, and more desirably between 5 and 12%. In one embodiment, the impact resistant layer has an elongation that is between about 6 and 10%, such as from about 8 to 10%. In one embodiment, the impact resistant layer has an elongation that is less than 20%, and in particular less than 10%.

The impact resistant layer has a tensile strength that is generally from about 445 to 1800 Newtons (N). In one particular embodiment, the impact resistant layer has a tensile strength that is from about 500 to 1500 N, 600 to 1200 N, or from about 800 to 1,000 N. In some embodiments, the impact resistant layer has a tensile strength that is from about 600 to 1,800, 1,000 to 1,800 N and from about 1,200 to 1,600 N. Percent elongation and tensile strength are measured in accordance with the test procedures described below under the section entitled "Test Methods."

The strands comprising the impact resistant layer can comprise a variety of different materials, such as nylon, polyester, fiberglass, cut resistant fibers, such as aramids including KEVLAR®, and combinations thereof. Suitable polyesters may include polyethylene terephthalate, polytrimethylene, terephthalate, and polytributylene terephthalate. In one embodiment, the impact resistant layer comprises a combination of fiberglass strands and polyethylene terephthalate strands. For example, the impact resistant layer may include from about 50 to 95 wt % of fiberglass strands and from about 5 to 45 wt % polyethylene terephthalate strands. In some embodiments, the impact resistant layer may desirably comprise about 60 to 90 wt. % fiberglass strands and from about 10 to 40 wt. % polyethylene terephthalate strands, and more desirably from about 75 to 85 wt. % fiberglass strands, and from about 15 to 25 wt. % polyethylene terephthalate strands. Suitable materials for the impact resistant layer include scrim materials available from Milliken Co., and Saint Gobain.

The impact resistant layer 20 and the barrier layer 22 are preferably bonded, adhered or laminated together to form a single composite. Preferably, the impact resistant layer 20 has a strong adherence to the barrier layer 22 and/or fibrous substrate 24. As discussed in greater detail below, typical bonding and lamination procedures may include those that involve adhering the impact resistant layer and barrier layer together with or without an adhesive, or using heat, pressure or both to combine these materials. In one embodiment, the impact resistant layer 20 and the barrier layer 22 can be attached to each other with thermal bonding, adhesive bonding, and the like. The resulting impact resistant sheet material generally has a thickness of about 10 to 60 mils, and in particular, from about 20 to 50 mils, and more particularly, about 30 to 35 mils.

As noted above, the barrier layer 22 may comprise a fibrous substrate that is moisture vapor permeable and substantially liquid impermeable. In this regard, FIG. 3 illustrates an embodiment of the invention in which the barrier layer 22 comprises a fibrous nonwoven sheet material comprising a plurality of filaments and/or fibers that are thermally bonded to each other to form a strong and coherent web. In one embodiment, the barrier layer 22 may comprise a spunbond nonwoven web comprising flash-spun polyethylene plexifilamentary fibers that are thermally bonded to one another. An example of one such barrier fabric is TYVEK®, a nonwoven fabric composed of flashspun high-density polyethylene fibers, which is available from E. I. du Pont de Nemours and Company of Wilmington, Del. ("DuPont"). In one particular embodiment, the fibrous substrate comprises a spunbond nonwoven that is formed of substantially continuous polypropylene filaments, and is commercially available from FIBERWEB™ and sold under the trademark TYPAR® or TEKTON®.

Suitable materials for the fibrous substrate 24 may include a nonwoven, woven, or extruded webs. Suitable webs may include spunbond webs, woven slit films, carded webs, meltblown webs, flashspun webs, and the like. In a preferred embodiment, the fibrous substrate comprises a nonwoven web, such as spunbonded and centrifugally spun fabrics, and fabrics comprising discontinuous or staple fibers, such as carded staple fiber webs, needlepunched nonwovens, hydroentangled webs and the like. Melt blown webs of continuous or discontinuous fibers also may be suitable. In one embodiment, the fibrous substrate comprises a high tenacity nonwoven fabric formed from polymeric fibers which are randomly disposed and bonded to one another to form a strong nonwoven web. Generally, it is important for the substrate to have high tenacity and relatively low elongation in order to provide the strength and other physical properties required for a barrier material such as a housewrap. In one particular embodiment, the fibrous substrate comprises a spunbond nonwoven that is formed of substantially continuous polypropylene filaments. Such a nonwoven is commercially available from Fiberweb of Old Hickory, TN and sold under the trademark TYPAR®Housewrap or TEKTON®Housewrap.

With reference to FIGS. 4 and 5, embodiments of the invention are illustrated in which the barrier layer 22 comprises a fibrous substrate 24 to which a breathable, substantially liquid impermeable coating layer 26, such as a film layer has been adhered.

Preferably, the film layer 26 has a strong adherence to the fibrous substrate 24, such that the film layer and the substrate are not subject to delamination but instead are structurally combined with one another to form a composite material. Generally, the peel adhesion of the film layer 26 to the fibrous substrate 24 is at least 59 g/cm (150 grams/inch), and preferably at least 78 g/cm (200 grams/inch). Most desirably, the adhesion is so great that the fibers of the substrate will tear or break before delamination will occur. Adhesion of the film to the substrate is measured in accordance with the test procedure described below under the section entitled "Test Methods."

The thermoplastic polymer fibers or filaments comprising the fibrous substrate 24 may contain pigments as well as chemical stabilizers or additives for retarding oxidation and ultraviolet degradation, and for imparting other desired properties such as antimicrobial, antimold, or antifungal. Typically, the stabilizers and additives are incorporated in the polymer at conventional levels, e.g., on the order of about 0.5 to 2% by weight. Typical stabilizers may include primary antioxidants (including hindered amine-light stabilizers and phenolic stabilizers), secondary antioxidants (such as phosphates), and ultraviolet absorbers (such as benzophenones). The polymer composition of the fibers or filaments may also contain a pigment to render the fibrous substrate opaque. In one particular embodiment, the fibers can be pigmented black using a black pigment, such as carbon black. If a white color is desired, titanium dioxide pigment can be used at comparable levels, or blends of titanium dioxide, with carbon black or with other colored pigments could be employed. The fibers or filaments are preferably circular in cross-section, although other cross-sectional configurations such as trilobal or multilobal cross-sections can be employed if desired.

The fibrous substrate 24 generally has a basis weight of at least 40 g/m², such as 50 g/m² or greater. In some embodiments, the fibrous substrate may have a basis weight that is from about 60 to 140 g/m², and for certain embodiments, a basis weight of from 80 to 110 g/m².

In one embodiment, the fibrous substrate has a grab tensile strength of at least 178 Newtons (40 pounds) in at least one of the machine direction (MD) or the cross-machine direction (CD). More preferably, the nonwoven substrate has a grab tensile strength of at least 267 N (60 pounds) in at least one of the MD and the CD. High tenacity and low elongation can be achieved by selection of a manufacturing process in which the polymer fibers of the nonwoven fabric are drawn to achieve a high degree of molecular orientation, which increases fiber tenacity and lowers fiber elongation. In this particular embodiment, the manufacturing process involves mechanically drawing the fibers by means of draw rolls, as distinguished from other well-known manufacturing processes for nonwovens which utilize pneumatic jets or slot-draw attenuators for attenuating the freshly extruded fibers. Mechanically drawing the fibers may allow for higher stresses in the fiber to orient the polymer molecules in the fibers and thereby strengthen the fibers. The drawing is carried out below the melting temperature of the polymer, after the polymer has cooled and solidified. This type of drawing process is conventionally referred to as "cold-drawing" and the thus-produced fibers may be referred to as "cold-drawn" fibers. Because the fibers are drawn at a temperature well below the temperature at which the polymer solidifies, the mobility of the oriented polymer molecules is reduced so that the oriented polymer molecules of the fiber cannot relax, but instead retain a high degree of molecular orientation. The degree of molecular orientation of the fiber can be determined by measuring the birefringence of the fiber. Cold-drawn fibers of the type used in the present invention are characterized by having a higher birefringence than fibers attenuated by pneumatic jets or slot-draw attenuators. Consequently, the individual fiber tenacity of a cold-drawn fiber is significantly greater than that of a fiber which is attenuated or stretched by pneumatic jets or attenuators of the type used in some spunbond nonwoven manufacturing processes.

In one embodiment, the film layer 26 of the impact resistant sheet material 10 is a moisture vapor permeable and substantially liquid impermeable polymeric film. Suitable materials for the film layer 26 may include breathable polymeric films that are inherently permeable to moisture vapor, such as a monolithic film, or microporous films. The film can comprise a preformed film that is laminated to the fibrous substrate, or may comprise a film that is coextruded onto the fibrous substrate. Generally, the film layer can have a gauge or a thickness between about 0.25 and 20 mils and, in particular from 0.25 mils, and more particularly from about 1 to 5 mils. The film layer may be applied to the fibrous substrate at a minimum basis weight of 25 g/m², and most desirably, from 30 to 50 g/m².

In the case of a microporous film, the microporous film layer may be rendered microporous, and hence breathable, by mechanically stretching the film to create microporous openings therein, or by using oils, additives, contaminants, and the like that create a breathable material via phase separation within the film. Methods of mechanically stretching the film include passing the film through a pair of embossing rollers or passing film through one or more intermeshing rollers that incrementally stretch the film and thereby create microporous openings in the film at the points of stretching. The microporous film can also be mechanically stretched by passing the film over a series of rollers in which a downstream roll is driven at a greater rate of speed than an upstream roll.

Suitable polymeric materials for the film layer include nylons, polyvinyl chloride (PVC), polyvinyl alcohol (PVA), polyolefins, such as polyethylene, polypropylene, metallocenes, and blends thereof, as well as blends of polyolefins with other polymers. In a preferred embodiment, the composition from which the film layer 26 is formed is prepared by blending or compounding one or more thermoplastic polymers with suitable inorganic or organic pore-forming fillers and with suitable additives, stabilizers and antioxidants.

In one particular embodiment, the film layer 26 comprises a polymer composition that includes at least one polyolefin polymer component, such as polypropylene, propylene copolymers, homopolymers or copolymers of ethylene, and copolymers such as ethylene vinylacetate (EVA), ethylene methyl acrylate (EMA) and ethylene acrylic acid (EAA), or blends of such polyolefins. The polymer composition may, for example, comprise 100% polypropylene homopolymer, or blends of polypropylene and polyethylene. Suitable polyethylenes include low density polyethylene, high density polyethylene, linear low density polyethylene (LLDPE), and blends thereof. The polymer composition may also include other nonolefin polymers.

Preferably, the polymer composition is blended with a pore-forming filler that helps render the film microporous upon being mechanically stretched. Generally speaking, the filler material may be any mechanical pore-forming agent that does not adversely affect the properties of the present invention. Fillers that may be used in connection with the present invention include inorganic or organic materials. Examples of the inorganic and organic fillers include calcium carbonate, talc, clay, kaolin, silica, diatomaceous earth, magnesium carbonate, barium to carbonate, magnesium sulfate, barium sulfate, calcium sulfate, aluminum hydroxide, zinc oxide, magnesium hydroxide, calcium oxide, magnesium oxide, titanium dioxide, alumina, mica, glass powder, zeolite, silica clay, acetyl salicylic acid, molecular sieves, ion exchange resins, wood pulp, pulp powder, ferrous hydroxide, borox, soda line, alkaline earth metals, baking soda, activated alumina, etc. Calcium carbonate is particularly preferred for low cost, whiteness, inertness, and availability. Calcium carbonate is particularly preferred as a pore-forming filler, and it is preferred that the calcium carbonate be treated with calcium stearate to render it hydrophobic and to prevent agglomeration or clumping. Preferably, the pore-forming filler has a particle size of no more than about 5 microns.

To achieve the high level of MVTR required for barrier applications, such as a housewrap, it is preferred that the polymer and pore-forming filler blend comprise at least 20% by weight filler, and desirably at least 40% by weight filler, and most desirably at least 50% by weight filler. The polymer composition may also include additional colorants or pigments, such as titanium dioxide, as well as conventional stabilizers and antioxidants, such as UV stabilizers, hindered amine light stabilizer compounds, ultraviolet absorbers, antioxidants and antimicrobials.

In one embodiment, the film layer 26 is extruded and laminated directly onto the fibrous substrate 24 in a single process. For example, the film-forming polymer composition is heated and mixed in an extruder, and is extruded from a slot die to form a molten polymer film. The molten polymer film is brought directly into contact with the fibrous substrate 24 and the molten film composition is forced into intimate engagement with the fibrous web by directing the materials through a nip defined by a pair of cooperating rotating rolls formed between a metal roll and a rubber roll. The fibrous substrate layer may be provided as a web, for example supplied from a roll, and the film layer and the barrier layer comprising the combination of the fibrous substrate and film layer are passed through the nip of the rolls to adhere the film layer to the surface of the fibrous substrate. The barrier layer thus formed can then be subjected to stretching to render the film layer microporous.

As noted above, various stretching techniques can be employed to develop the micropores in the impact resistant sheet material 10. A particularly preferred stretching method is a process known as "incremental stretching". In an incremental stretching operation, the sheet material is passed through one or more cooperating pairs of intermeshing grooved or corrugated rolls which cause the sheet material to be stretched along incremental zones or lines extending across the sheet material. The stretched zones are separated by zones of substantially unstretched or less stretched material. The incremental stretching can be carried out in the cross machine direction (CD) or the machine direction (MD) or both, depending upon the design and arrangement of the grooved rolls. Example of apparatus and methods for carrying out incremental stretching are described in U.S. Pat. Nos. 4,116,892; 4,153,751; 4,153,664; and 4,285,100, incorporated herein by reference. In one embodiment, the barrier layer (i.e., the combination of the fibrous substrate and film layers) is incrementally stretched to a permanent elongation less than about 5%. The barrier layer can be incrementally stretched to a permanent elongation less than about 2%, more specifically less than about 1%. Alternatively, the barrier layer can be incrementally stretched without any permanent elongation of the material.

In a preferred embodiment, the barrier layer 22 comprises a spunbond nonwoven that is formed of substantially continuous polypropylene filaments to which a polymeric film comprising polypropylene and about 40 to 50 weight % filler is extrusion-coated. Examples of such composites for the barrier layer are described in commonly assigned, copending U.S. Patent Publication No. 2004/0029469, the content of which is hereby incorporated by reference.

Figure 6:
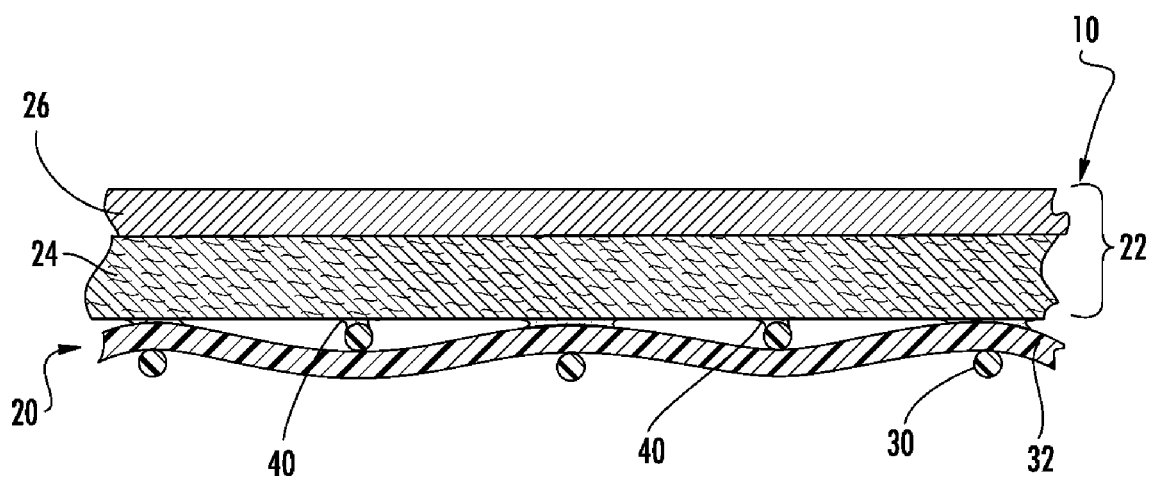
FIG. 6 is a cross-sectional side view of the impact resistant sheet material of FIG. 4 taken along line 6-6 of FIG. 4.

After depositing the film layer on the fibrous substrate, the resulting barrier layer can be rolled-up and the stretching can be carried out in a separate subsequent operation, or alternatively, the stretching can be carried out in-line with the extrusion coating operation. After stretching, the impact resistant layer can be adhered to a surface of the fibrous substrate opposite the film layer. As discussed above, the impact resistant layer can be adhesively adhered to the fibrous substrate. In some embodiments, the adhesive is applied only to the strands comprising the impact resistant layer so that the fibrous substrate and impact resistant layer are only bonded to each other at points of contact. This may be particularly useful in embodiments in which the adhesive has a lower than desired moisture vapor transmission rate. In this regard, FIG. 6 is a cross-sectional side view of the impact resistant sheet material 10 taken along line 6-6 of FIG. 4. As shown, an adhesive material 40 is located between the impact resistant layer 20 and the fibrous substrate 24 at points of contact between the two layers. In applications where it is desirable for the impact resistant sheet material to have breathability, the adhesive may be limited to only points of contact so that the surface of the fibrous substrate has sufficient surface area so that a desired level of breathability is maintained. In other embodiments, it may be desirable to select a breathable adhesive so that application of the adhesive does not adversely affect the breathability of the impact resistant sheet material.

Alternatively, the adhesive can be broadly applied to the fibrous substrate, such as a coating. In embodiments where the adhesive is applied as a coating, it may be desirable to select an adhesive that does not adversely affect the breathability of the impact resistant sheet material. It should be understood that adhesives having low MVTRs can be used in applications where breathability is not a concern.

A wide variety of adhesives can be used in the practice of the invention, which may include hot melt adhesives, pressure sensitive adhesives, UV cured adhesives, water-based adhesives, and the like In some embodiments, the adhesive may also include additional agents such as fire retardants, UV stabilizers, and the like.

The impact resistant sheet material can be subjected to heat in order to dry the adhesive layer and thereby securely adhere the fibrous substrate to the impact resistant layer. In some cases, heating of the impact resistant layer can result in shrinkage of the film layer, which can in turn result in shrinkage of the microporous openings. Accordingly, care should be given in selecting the temperature for drying the adhesive layer. In some embodiments, it may be desirable to pre-stretch the barrier layer (i.e., the combination of the film and fibrous substrate) prior to attaching the impact resistant layer. Pre-stretching increases the size of the microporous openings so that if shrinkage does occur, the microporous openings will still remain open and the breathability of the film layer will not be adversely affected. For example, the barrier layer can be pre-stretched so that its breathability is increased by up to 1, 2, 3, 4, or 5% prior to attachment of the impact resistant layer.

From the foregoing discussion, it should be apparent that the impact resistant sheet material of the present inventions can be used in a variety of different construction applications, such as housewrap materials, flashing, roofing underlayment, and the like. In some embodiments, the impact resistant sheet material can also be used to protect objects such as trailers, boats, automobiles, and the like from impacts with wind-borne debris.

The impact resistant sheet material can be mounted on the exterior sheathing of a walls structure in the same way conventional housewrap sheet material is applied. For example, the impact resistant sheet material can be incorporated into a wall structure comprising a plurality of framing members, such as "2×4" studs, to which an exterior sheathing, such as oriented strand board (OSB), plywood, or gypsum board has been attached. The sheathing can comprise a fiber insulation board formed from one or more of mineral fibers such as glass fibers, rock wool fibers, slag fibers, organic fibers, ceramic fibers (e.g., alumina), silica or basalt fibers that are resin bonded into a rigid or semi-rigid board. The impact resistant sheet material can be secured to the sheathing with a variety of different fasteners, such as staples, nails, and the like. The walls structure typically includes an outer cladding that is provided on the exterior side of the impact resistant sheet material. The cladding can be concrete masonry, ceramic tiles, glass, treated wood panel, siding, fiber cement weather board, shingles, bricks, stucco or stone, or the like.

Figure 7:
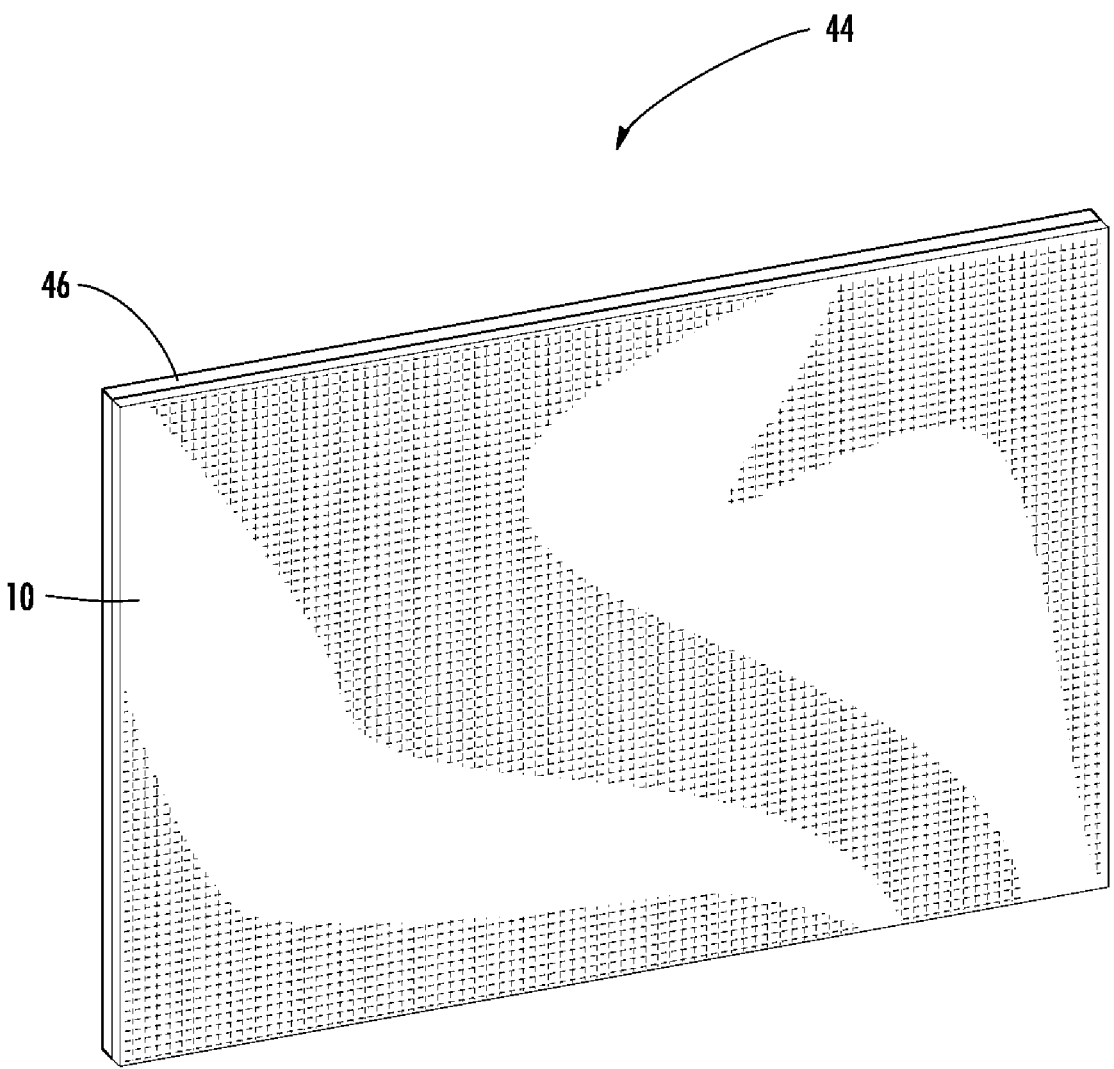
FIG. 7 is a perspective view of a composite wall panel that includes a substrate to which the impact resistant sheet material of the present invention has been attached.

FIG. 7 illustrates another possible application for the impact resistant sheet material. In this embodiment, instead of being applied to the exterior sheathing of a completed building like a housewrap material, the impact resistant sheet material forms part of a composite panel 44 comprising a substrate 46 to which the impact resistant sheet material 10 has been attached. Substrate 46 can comprise a sheathing material such as oriented strand board (OSB), plywood, gypsum board, and the like. In some embodiments, substrate 46 can comprise an insulating material such as a mineral fiber material, including mineral fiber board, polystyrene or other foam materials. The impact resistant sheet material can be attached to the substrate with fasteners, adhesives, and the like. In some embodiments, the impact resistant sheet material is laminated to the substrate. In one embodiment, a plurality of composite panels 44 can be used to envelop a building structure and thereby provide an exterior wall structure having moisture and air barrier properties as well as impact resistance.

In additional embodiments, the impact resistant sheet material of the present invention can also be used advantageously in the construction of so called "safe rooms" that can be used to protect specific interior rooms or areas of buildings from objects moving at relatively high rates of speed, such as wind-borne debris. In this regard, FIG. 8 illustrates a building 12 having an interior room 50 with a plurality of walls 52 to which the impact resistant sheet material 10 has been applied. During a wind storm, occupants of the building 12 can seek shelter in safe room 50 from wind borne debris. Preferably, safe room 50 is located within the interior of the building that is spaced apart from the exterior walls of the building, In embodiments wherein the impact resistant sheet material is utilized to protect interior rooms, such as discussed above, the impact resistant sheet material does not necessarily have moisture barrier properties. For example, in this embodiment the impact resistant material may include both the impact resistant layer and the fibrous substrate, and in some cases might not include a layer that could be considered a moisture barrier layer. Suitable materials for the impact resistant layer and the fibrous substrate include those discussed above.

In some embodiments, the impact resistant sheet material may lack barrier properties. For example, in one embodiment, the impact resistant sheet material may comprise the impact resistant layer that is attached to a relatively open fibrous substrate.

Test Methods

In the description above and in the non-limiting examples that follow, the following test methods were employed to determine various reported characteristics and properties. ASTM refers to the American Society for Testing and Materials, AATCC refers to the American Association of Textile Chemists and Colorists, INDA refers to the Association of the Nonwovens Fabrics Industry, and TAPPI refers to the Technical Association of Pulp and Paper Industry.

The following tests are hereby incorporated by reference.

Basis Weight is a measure of the mass per unit area of a sheet and was determined by ASTM D-3776, which is hereby incorporated by reference, and is reported in $g/m^2$. Fabric thickness is measured in accordance with ASTM D 1777—Standard Test Method for Thickness of Textile Materials (1996).

Air Leakage Rate is a measure of determining air leakage across a specimen under specified differential pressure conditions across the specimen. This test is carried out in accordance with ASTM E 283 and E 2178.

Percent Elongation is a measure of the maximum elongation of a fabric at failure when subjected to unidirectional stress. Percent Elongation is determined according to ASTM D 5034-95.

Grab Tensile Strength is a measure of breaking strength of a fabric when subjected to unidirectional stress. This test is carried out in accordance with ASTM D 4632—Standard Test Method for Grab Breaking Load and Elongation of Geotextiles, 1991 (reapproved 1996).

Gurley Porosity is a measure of the resistance of the sheet material to air permeability, and thus provides an indication of its effectiveness as an air barrier. It is measured in accordance with TAPPI T-460 (Gurley method). This test measures the time required for 100 cubic centimeters of air to be pushed through a one-inch diameter sample under a pressure of approximately 4.9 inches of water. The result is expressed in seconds and is frequently referred to as Gurley Seconds.

Hydrostatic Head (hydrohead) is a measure of the resistance of a sheet to penetration by liquid water under a static pressure. The test is conducted according to AATCC-127, which is hereby incorporated by reference, and is reported in centimeters.

Impact Resistance Free-Falling Dart Method is a measure of the weight required to cause 50% of tested films to failure by impact from a falling dart under specified test conditions. Impact resistant Free-Falling Dart measurements are determined in accordance with ASTM D-1709, Method B2 (2004).

Miami-Dade County Large Missile Impact Test (Miami-Dade Protocols PA 201, PA 202, and PA 203). Under this test the wall structure is impacted with a two-by-four (2"×4") board weighing 9 lbs. and traveling at approximately 34 mph. To successfully past the test, at least three separate impacts are conducted and the wall structure must prevent the board from both penetrating the wall structure or creating a significant opening.

Moisture Vapor Transmission Rate (MVTR) is determined by ASTM E 96, Standard Test Methods for Water Vapor Transmission of Materials; 1995, Procedure A.

Mullen burst strength is determined by ASTM D-3786 (1987), Standard Test Method for Hydraulic Bursting Strength of Textile Fabrics—Diaphragm Bursting Strength Tester Method.

Peel Strength is measured in accordance with ASTM D 2724.

Puncture strength is measured according to ASTM D-4833-88.

Tear Strength is measured in accordance with ASTM D 4533 (trapezoidal tear), tensile strength measurements are determined according to ASTM D 5034-95.

Example 1

TYPAR® 3201, a spunbonded polypropylene nonwoven fabric produced by FIBERWEB® of Old Hickory, Tenn., was used as the fibrous nonwoven substrate for producing a high MVTR extrusion coated composite sheet material. TYPAR® 3201 is a spunbond polypropylene nonwoven fabric having a basis weight of 64 g/m$^2$, a thickness of 0.229 mm (9 mils), an MD grab tensile strength of 360 N (81 lbs.), a CD grab tensile strength of 329 N (74 lbs.), a trapezoidal tear strength of 165 N (37 lbs.) in the MD and 151 N (34 lbs.) in the CD, and a Mullen burst strength of 379211 Pascal (55 psi.). This substrate was extrusion-coated with a polypropylene polymer composition containing about 50 percent by weight calcium carbonate filler. The polymer film was extruded onto the substrate at a basis weight of 30 g/m$^2$. The resulting composite was incrementally stretched in the CD.

After being incrementally stretched, the combination of the nonwoven substrate and polymer film was stretched in the cross direction to increase its breathability by about 5% percent. A scrim layer (i.e., impact resistant layer) was then adhesively bonded to the surface of the fibrous substrate opposite the film layer. In this step, a water soluble adhesive was applied to the scrim layer. The scrim layer comprised a combination of fiber glass and polyethylene terephthalate strands, available from Milliken Co. The amount of adhesive applied was about 50 weight percent, based on the total weight of the scrim layer. The resulting sheet material was passed over a series of dryer cans to evaporate any excess water out of the sheet material. The drying step was performed at a temperature of about 100-110° C. Various properties of the resulting impact resistant sheet material are provided below.

TABLE 1

Properties of the Impact resistant Sheet Material

| Property | Test method | Units | Value |
|---|---|---|---|
| Hydrohead | AATCC 127 | cm | 550 |
| MVTR | ASTM E 96-A | g/m$^2$/day | 60 |
| Peel Strength | ASTM D 2724 | Lbs. | 2.94 |
| MD Tensile Strength | ASTM D 4632 | Lbs./inch | 233 |
| MD Elongation | ASTM D 4632 | % | 8.7 |
| CD Tensile Strength | ASTM D 4632 | Lbs./inch | 191 |
| CD Elongation | ASTM D 4632 | % | 6.9 |
| Thickness | ASTM D 1777 | mils | 21.3 |
| Basis Weight | ASTM D 3776 | osy | 7.6 |

The impact resistant sheet material also had a flame spread index of 25 and a smoke developed index of 200, as measured in accordance with ASTM E 84; a self-ignition temperature of 788° F., as measured in accordance with ASTM D 1929; and a burning rate of 54 mm/min as measured in accordance with ASTM D 635.

The impact resistance of the impact resistant sheet material of Example 1 was compared to various barrier sheet materials. The results are summarized in Table 2 below. The Samples described in Table 2 are as follows:

Sample 1: Inventive impact resistant sheet material described in Example 1, above.

Sample 2: TYVEK®, HOMEWRAP® available from Du Pont de Nemours and Company;

Sample 3: Woven slit film available from Lowes Product No. LW1490LOW, white 9'×150' rolls;

Sample 4: Breathable sheet material comprising a spunbond polypropylene substrate and an outer breathable, monolithic film layer, available from Fortifiber, under the trademark WEATHERSMART™;

Sample 5: R-Wrap produced by Covalence Coated Products (formerly Ludlow Coated Products).

TABLE 2

Impact Properties of Inventive Sheet Material vs. Various Barrier Sheet Materials

| Test | Sample 1 | Sample 2 | Sample 3 | Sample 4 | Sample 5 | Test Method |
|---|---|---|---|---|---|---|
| Free Falling Dart Impact Failure Weight (lbs.) (method B 2" dart @ 60") | 2.27 | <0.70 | 0.83 | <0.70 | — | ASTM D 1709-4 |
| Average Thickness (mm) | 0.669 | 0.076 | 0.108 | 0.265 | — | ASTM D 1777-75 |

TABLE 2-continued

Impact Properties of Inventive Sheet Material vs. Various Barrier Sheet Materials

| Test | Sample 1 | Sample 2 | Sample 3 | Sample 4 | Sample 5 | Test Method |
|---|---|---|---|---|---|---|
| Probe Penetration (psi) | 4,132 | 1,604 | 2532 | 948 | 1,749 | ASTM D 4833-88 |
| Mullen Burst | 500* | 103 | 123 | 51 | 91 | ASTM 3786-87 |

*Maximum test equipment pressure 500 psi - sample exceeded equipment capability.
** <0.70 = minimum weight for the impact head with no additional weights is 0.70 lbs.

The Impact resistant sheet material of the present invention was also tested according to the Miami-Dade County Large Missile Impact Test. To pass the Miami-Dade County Large Missile Impact Test, the impact resistant material was tested according to the following tests:

Air infiltration in accordance with Testing Application Standard (TAS) 202-94 (ASTM E 283-04);

Water Resistance tests in accordance with TAS 202-94 (ASTM E 331-00);

Structural Performance test in accordance with TAS 202-94 (ASTM E 330-02);

Impact Resistance in accordance with TAS 201-94; and

Cyclic tests in accordance with TAS 203-94, the contents of which are all hereby incorporated by reference.

In accordance with the Miami-Dade County Large Impact Missile Test, two wall panels comprising the impact resistant sheet material of Example 1 were constructed according to the following specifications and the wall 60 illustrated in FIG. 9.

Wall Panel 1

Interior wall (62): 1.2" Drywall fastened to studs (66) with 1¼" self-tapping screws at each end, 8" on center;

Studs (66): 3½", 18 gauge steel, 24" on center;

Stud Cavities (67): R-13, 3½" Kraft faced fiberglass insulation (not shown);

Exterior sheathing (72): ⅝" DensGlass Gold fastened to studs 66 with 1¼" self-tapping screws at each end, 8" on center;

Exterior housewrap (10): Impact resistant sheet material of Example 1, fastened to studs with 1¼" self-tapping 1" plastic cap screws, 16" on center;

Metal Lath (68): 33.2 self-furring galvanized, 96×24" sheets mounted horizontally with a 4' overlap, fastened with 1¼" S 12 screws 6";

Exterior stucco (70) 3-layers: 1) scratch coat: mixture of sto powder wall stucco and 200# mason sand, approximately ⅓" thick, notch troweled; 2) brown coat: applied with sto powder and mason sand ¾" thick, then rodded off smooth; and 3) finish coat: mixture of 50 lb. bag of Ivory autoclaved lime, ½ bag (46.3 lbs) of Portland cement, 1½ bags (150 lbs) of 30/40 silica.

Wall Panel 2

Wall Panel 2 was constructed similarly to Wall Panel 1, with the exception that the Wall Panel 2 included the following additional components:

Exterior Foam Board disposed adjacent to the impact resistant layer, the foam board comprised a 2'×4'×1½" polystyrene bead board fastened to studs with 3" Windlock wind Devil II fasteners-9/board. Each fastener was spotted with primas MD (Dryvit). The exterior of the Wall Panel 2 comprised an exterior base coat of Dryvit Primas MD with a layer of Dryvit 40 oz mesh embedded, and a Finish Coat comprised of Dryvit finish with Dryvit medium base sand pebbles.

The impact resistance of Wall Panels 1 and 2 was tested in accordance with Testing Application Standard (TAS) 201-94, the content of which is hereby incorporated by reference. In accordance with 6.3.2.1 Large Missile, the impact resistant test was carried out with a missile projectile that comprised a solid S4S nominal 2=4 #2 surface dry southern Pine. The weight of the Missile was 9 lbs, and had a length of at 7 feet. The missile was fired at various locations on each of the wall panels at a speed of 34 mph as specified in Tables 4 and 7 below. A specimen is considered to fail if the impact results in a change in condition of the specimen indicative of deterioration under repeated load or incipient failure, such as cracking, fastener loosening, local yielding, or loss of adhesive bond.

Upon successfully passing TAS 201-94, Wall Panels 1 and 2 were tested under a cyclic wind pressure loading in accordance with TAS 203-94, the content of which is hereby incorporated by reference. In accordance with this test, Wall Panels 1 and 2 were subjected to a positive and negative load to create inward and outward loading on the wall panels. Successful specimens have no resultant failure or distress and shall have a recovery of at least 90% over maximum deflection. The results of the testing are summarized in the Tables below.

Three specimens for each of Wall Panels 1 and 2 were tested. The results for Wall Panel 1 are summarized in Tables 3-5 below.

TABLE 3

TAS202 TEST RESULTS WALL PANEL 1 (+/−30 psf design pressure)

| Test | ASTM Test Method | Load Lbs/ft² | Deflection Top (in.) | Deflection Center Span (in) | Deflection Bottom (in) | Results | Load Duration |
|---|---|---|---|---|---|---|---|
| Air Infiltration | E283 | 1.57 | N/A | N/A | N/A | BDL* Scfm/ft² | N/A |
| Preload (Pos.) | E330 | +22.5 | 0.071" | 0.103" | 0.033" | Pass | 30 sec |
| Preload Perm. Set | | 0 | 0.029" | 0.035" | 0.017 | 0.012" | — |
| Design Load (Pos.) | E330 | +30 | 0.112" | 0.164" | 0.056" | Pass | 30 sec |
| Design Load Perm Set | | 0 | 0.042" | 0.056" | 0.031" | 0.020" | — |
| Preload (Neg.) | E330 | −22.5 | 0.180" | 0.183" | 0.051" | Pass | 30 sec |
| Preload Perm. Set | | 0 | 0.031" | 0.080" | 0.023" | 0.053" | — |
| Design Load (Neg.) | E330 | −30 | 0.300" | 0.329" | 0.091" | Pass | 30 sec |
| Design Load Perm. Set | | 0 | 0.074" | 0.162" | 0.055" | 0.098" | — |

TABLE 3-continued

TAS202 TEST RESULTS WALL PANEL 1 (+/−30 psf design pressure)

| Test | ASTM Test Method | Load Lbs/ft² | Deflection Top (in.) | Deflection Center Span (in) | Deflection Bottom (in) | Results | Load Duration |
|---|---|---|---|---|---|---|---|
| Water Resistance | E331 | +4.5 | N/A | N/A | N/A | Pass | 15 min. |
| Test Load (Pos.) | E330 | +4.5 | 0.126" | 0.299" | 0.117" | Pass | 30 sec |
| Test Load Perm. Set | | 0 | 0.006" | 0.068" | 0.052" | 0.039" | — |
| Test Load (Neg.) | E330 | −4.5 | 0.283" | 0.358" | 0.128" | Pass | 30 sec |
| Test Load Perm. Set | | 0 | 0.051" | 0.153" | 0.093" | 0.081" | — |
| Forced Entry | TAS202 | N/A | N/A | N/A | N/A | N/A | N/A |

*Air infiltration was below the detectable limits of the equipment used.

TABLE 4

TAS201 Large Missile Impact Test Results of Wall Panel 1

| Specimen No. | Impact Locations | Speed | Observations | Remarks |
|---|---|---|---|---|
| #1 | 1 Lower Corner | 50.1 ft/sec | Penetrated Stucco, slight tear in wrap | Pass |
| | 2 Center of Wall Panel - 3" from stud | 50.3 ft/sec | Penetrated Stucco, slight tear in wrap | Pass |
| #2 | 1 Center of Wall Panel - 3" from stud | 50.5 ft/sec | Penetrated Stucco, slight tear in wrap | Pass |
| | 2 Upper Corner | 49.8 ft/sec | Penetrated Stucco, slight tear in wrap | Pass |
| #3 | 1 Lower Corner | 50.2 ft/sec | Penetrated Stucco, slight tear in wrap | Pass |
| | 2 Center of Wall Panel - 3" from stud | 50.4 ft/sec | Penetrated Stucco, slight tear in wrap | Pass |

TABLE 5

TAS203 Cycling Test Results
Design Pressure: +/−30 spf

| | Pressure | Specimen No. 1 | | | Specimen No. 2 | | | Specimen No. 3 | | |
|---|---|---|---|---|---|---|---|---|---|---|
| Cycles | (lbs/ft²) | Def. | Set | Remarks | Def. | Set | Remarks | Def. | Set | Remarks |
| 600 | 0-15 | N/A | N/A | Pass | N/A | N/A | Pass | N/A | N/A | Pass |
| 70 | 0-18 | N/A | N/A | Pass | N/A | N/A | Pass | N/A | N/A | Pass |
| 1 | 0-39 | N/A | N/A | Pass | N/A | N/A | Pass | N/A | N/A | Pass |
| 600 | 0-15 | N/A | N/A | Pass | N/A | N/A | Pass | N/A | N/A | Pass |
| 70 | 0-18 | N/A | N/A | Pass | N/A | N/A | Pass | N/A | N/A | Pass |
| 1 | 0-39 | N/A | N/A | Pass | N/A | N/A | Pass | N/A | N/A | Pass |

Test Results for Wall Panel 2

TABLE 6

TAS202 TEST RESULTS WALL PANEL 2 (+/−30 psf design pressure)

| Test | ASTM Test Method | Load Lbs/ft² | Deflection Top (in.) | Deflection Center Span (in) | Deflection Bottom (in) | Results | Load Duration |
|---|---|---|---|---|---|---|---|
| Air Infiltration | E283 | 1.57 | N/A | N/A | N/A | BDL* Scfm/ft² | N/A |
| Preload (Pos.) | E330 | +22.5 | 0.150" | 0.230" | 0.072" | Pass | 30 sec |
| Preload Perm. Set | | 0 | 0.016" | 0.034" | 0.023 | 0.015" | — |
| Design Load (Pos.) | E330 | +30 | 0.185" | 0.325" | 0.115" | Pass | 30 sec |
| Design Load Perm Set | | 0 | 0.026" | 0.060" | 0.052" | 0.021" | — |

TABLE 6-continued

TAS202 TEST RESULTS WALL PANEL 2 (+/−30 psf design pressure)

| Test | ASTM Test Method | Load Lbs/ft$^2$ | Deflection Top (in.) | Deflection Center Span (in) | Deflection Bottom (in) | Results | Load Duration |
|---|---|---|---|---|---|---|---|
| Preload (Neg.) | E330 | −22.5 | 0.197" | 0.333" | 0.177" | Pass | 30 sec |
| Preload Perm. Set | | 0 | 0.033" | 0.108" | 0.110" | 0.037" | — |
| Design Load (Neg.) | E330 | −30 | 0.246" | 0.446" | 0.237" | Pass | 30 sec |
| Design Load Perm. Set | | 0 | 0.051" | 0.147" | 0.144" | 0.050" | — |
| Water Resistance | E331 | +4.5 | N/A | N/A | N/A | Pass | 15 min. |
| Test Load (Pos.) | E330 | +4.5 | 0.306" | 0.653" | 0.347" | Pass | 30 sec |
| Test Load Perm. Set | | 0 | 0.066" | 0.206" | 0.252" | 0.047" | — |
| Test Load (Neg.) | E330 | −4.5 | 0.269" | 0.680" | 0.424" | Pass | 30 sec |
| Test Load Perm. Set | | 0 | 0.060" | 0.219" | 0.273" | 0.051" | — |
| Forced Entry | TAS202 | N/A | N/A | N/A | N/A | N/A | N/A |

*Air infiltration was below the detectable limits of the equipment used.

TABLE 7

TAS201 Large Missile Impact Test Results Wall Panel 2

| Specimen No. | Impact Locations | Speed | Observations | Remarks |
|---|---|---|---|---|
| #1 | 1 Lower Corner | 50 ft/sec | Penetrated Stucco, slight tear in wrap | Pass |
|  | 2 Center of Wall Panel - 3" from stud | 50 ft/sec | Penetrated Stucco, slight tear in wrap | Pass |
| #2 | 1 Upper Corner | 50 ft/sec | Penetrated Stucco, slight tear in wrap | Pass |
|  | 2 Center of Wall Panel - 3" from stud | 50 ft/sec | Penetrated Stucco, slight tear in wrap | Pass |
| #3 | 1 Lower Corner | 50 ft/sec | Penetrated Stucco, slight tear in wrap | Pass |
|  | 2 Center of Wall Panel - 3" from stud | 50 ft/sec | Penetrated Stucco, slight tear in wrap | Pass |

TABLE 8

TAS203 Cycling Test Results
Design Pressure: +/−30 spf

| Cycles | Pressure (lbs/ft$^2$) | Specimen No. 1 | | | Specimen No. 2 | | | Specimen No. 3 | | |
|---|---|---|---|---|---|---|---|---|---|---|
| | | Def. | Set | Remarks | Def. | Set | Remarks | Def. | Set | Remarks |
| 600 | 0-15 | N/A | N/A | Pass | N/A | N/A | Pass | N/A | N/A | Pass |
| 70 | 0-18 | N/A | N/A | Pass | N/A | N/A | Pass | N/A | N/A | Pass |
| 1 | 0-39 | N/A | N/A | Pass | N/A | N/A | Pass | N/A | N/A | Pass |
| 600 | 0-15 | N/A | N/A | Pass | N/A | N/A | Pass | N/A | N/A | Pass |
| 70 | 0-18 | N/A | N/A | Pass | N/A | N/A | Pass | N/A | N/A | Pass |
| 1 | 0-39 | N/A | N/A | Pass | N/A | N/A | Pass | N/A | N/A | Pass |

In addition to the wall structures above, wall samples were tested in which the wall included an exterior surface comprising vinyl siding and fiber cement board. The test results are summarized in Table 9 below.

The wall structures were impacted by a 9 pound two-by-four ("2×4") traveling at 34 mph in accordance with Miami-Dade County Large Missile Impact Test (TAS-201). Wall panels 3-10 were not tested with cyclic wind pressure loading in accordance with TAS 203-94. The wall panels in accordance with the invention includes the impact resistance sheet material of the present invention in which The following materials were used in the wall samples described in Table 9 below:

Vinyl siding available from Georgia Pacific, product number 135-WH;

½" Styrofoam sheathing available from Dow under the trademark Dow StyrofoaM™, or foam boards available from Johns Manville;

R-13 building insulation available from Johns Manville: JM kraft based batts or unfaced batt;

DensGlass sheathing available from Georgia-Pacific under the trademark DensGlass Gold®

Impact resistant sheet material is the same that used in Wall Panels 1 and 2 discussed above.

TABLE 9

| Sample No. | Panel Description (4-ft. × 8-ft. Wood Wall Stud Construction) | Test Results |
|---|---|---|
| Wall Panel 3 (Comparative) | Vinyl Siding<br>½ in. Dow Styrofoam sheathing<br>R-13 building insulation<br>"2 × 4" wood studs 16" on center<br>½ in. gypsum drywall. | Failed |
| Wall Panel 4 | Vinyl Siding<br>Impact Resistant Sheet Material<br>½ in. Dow Styrofoam sheathing<br>R-13 building insulation<br>"2 × 4" wood studs 16" on center<br>½ in. gypsum drywall. | Passed |
| Wall Panel 5 (Comparative) | Vinyl Siding<br>¾ in. expanded polystyrene foam<br>⅝ in. GP DensGlass sheathing<br>"2 × 4" wood studs 16" on center<br>R-13 building insulation<br>½ in. gypsum drywall. | Failed |
| Wall Panel 6 | Vinyl Siding<br>¾ in. expanded polystyrene foam<br>⅝ in. GP DensGlass sheathing<br>Impact Resistant Sheet Material<br>R-13 building insulation<br>"2 × 4" wood studs 16" on center<br>½ in. gypsum drywall. | Passed |
| Wall Panel 7 | Vinyl Siding<br>¾ in. expanded polystyrene foam<br>Impact Resistant Sheet Material<br>⅝ in. GP DensGlass sheathing<br>R-13 building insulation<br>"2 × 4" wood studs 16" on center<br>½ in. gypsum drywall. | Passed |
| Wall Panel 8 (Comparative) | Vinyl Siding<br>½ in. plywood sheathing<br>R-13 building insulation<br>"2 × 4" wood studs 16" on center<br>½ in. gypsum drywall. | Failed |
| Wall Panel 9 | Vinyl Siding<br>Impact Resistant Sheet Material<br>½ in. plywood sheathing<br>R-13 building insulation<br>"2 × 4" wood studs 16" on center<br>½ in. gypsum drywall. | Passed |
| Wall Panel 10 | Vinyl Siding<br>½ in. plywood sheathing<br>Impact Resistant Sheet Material<br>R-13 building insulation<br>"2 × 4" wood studs 16" on center<br>½ in. gypsum drywall. | Passed |
| Wall Panel 11 | Hardiplank ™ fiber cement board<br>Impact Resistant Sheet Material<br>⅝ in. GP DensGlass sheathing<br>R-13 building insulation<br>"2 × 4" steel studs 16" on center<br>½ in. gypsum drywall. | Passed |
| Wall Panel 12 (Comparative) | Hardiplank ™ fiber cement board<br>⅝ in. GP DensGlass sheathing<br>R-13 building insulation<br>"2 × 4" steel studs 16" on center<br>½ in. gypsum drywall. | Failed |

From the test results in Table 9, it can be observed that the impact resistant sheet material of the present invention was able to provide impact resistance to wall structures having vinyl siding as an exterior covering.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An impact resistant sheet material comprising:
a moisture vapor permeable, water-impermeable, polymeric barrier layer having a hydrohead of at least 55 cm and a moisture vapor transmission rate of at least 35 g/m$^2$/day; and
an impact resistant layer attached to the barrier layer, the impact resistant layer comprising a fabric layer having at least two pluralities of strands that extend in different directions and intersect each other, the impact resistant layer having a tensile strength of at least 445 Newtons, an elongation that is between 2 and 20 percent, and an Impact Resistance as measured by the Free-Falling Dart Method of greater than about 0.7 pounds, and wherein the strands of the impact resistant layer comprise fiberglass.

2. The impact resistant sheet material of claim 1, wherein the barrier layer comprises a nonwoven material.

3. The impact resistant sheet material of claim 1, wherein the barrier layer comprises a woven material.

4. The impact resistant sheet material of claim 1, wherein the barrier layer comprises a nonwoven substrate comprising polymeric fibers randomly disposed and bonded to one another, and a breathable polymeric film layer overlying one surface of the nonwoven substrate and intimately bonded thereto.

5. The impact resistant composite sheet material of claim 4, wherein the film layer comprises an extrusion coated polyolefin, and the nonwoven substrate comprises substantially continuous spunbond polypropylene filaments.

6. The impact resistant sheet material of claim 1, wherein the barrier layer comprises a fibrous substrate having a surface to which a microporous polymeric film layer has been extrusion-coated and is intimately bonded thereto.

7. The impact resistant sheet material of claim 1, wherein the barrier layer comprises a fibrous substrate having a surface to which a breathable monolithic polymeric film layer has been extrusion-coated and is intimately bonded thereto.

8. The impact resistant sheet material of claim 6, wherein the fibrous substrate is selected from the group consisting of spunbond webs, woven slit films, carded webs, meltblown webs, flashspun webs, woven, and extruded webs.

9. The impact resistant sheet material of claim 1, wherein the sheet material has a Mullen burst strength of at least 175 pounds and an Impact Resistance as measured by the Free-Falling Dart Method of greater than about 1 pound.

10. The impact resistant sheet material of claim 9, wherein the sheet material has an Impact Resistance as measured by the Free-Falling Dart Method of greater than 2 pounds.

11. The impact resistant sheet material of claim 1, wherein a wall structure employing the sheet material is able to successfully withstand an impact from a projectile comprising a 9 pound, 7 foot two-by-four traveling at a speed of at least 34 miles per hour without penetration of the wall structure.

12. The impact resistant sheet material of claim 1, wherein the impact resistant layer includes a first plurality of strands that extend in a first direction and a second plurality of strands that extend in a second direction substantially perpendicular to the first direction to define a grid-like pattern.

13. The impact resistant sheet material of claim 1, wherein the impact resistant layer includes a first plurality of strands that extend in a first direction, a second plurality of strands that extend in a second direction that is different than the first direction, and third and fourth pluralities of strands that both extend at an angle with respect to the first plurality of strands and are oriented at opposite angles with respect to each other so they intersect each other in an X-like pattern.

14. The impact resistant sheet material of claim 1, wherein the impact resistant layer has an elongation that is between about 6 and 10%.

15. The impact resistant sheet material of claim 1, wherein the impact resistant layer has a tensile strength that is from about 600 to 1200 N.

16. The impact resistant sheet material of claim 1, wherein the sheet material comprises a housewrap.

17. The impact resistant sheet material of claim 1, wherein the impact resistant sheet material when applied to a wall structure is able to successfully withstand an impact from a projectile comprising a 9 pound, 7 foot two-by-four traveling at a speed of at least 34 miles per hour without rupture of the sheet material.

18. The impact resistant sheet material of claim 17, wherein the sheet material is capable of passing the Large Missile Impact Resistance Test according to TAS 201-94,and the Cyclic Wind Pressure Loading Test according to TAS 203-94.

19. An impact resistant sheet material comprising a moisture vapor permeable, water impermeable composite sheet material having barrier properties making it suitable for use as a housewrap, the sheet material comprising:
a nonwoven substrate comprising polymeric fibers randomly disposed and bonded to one another to form a nonwoven web;
an extrusion coated polyolefin film layer overlying one surface of the substrate and intimately bonded thereto, the film layer having micropores formed therein to impart to the composite sheet material a moisture vapor transmission rate (MVTR) of at least 35 $g/m^2$/day at 50% relative humidity and 23° C. and a hydrostatic head of at least 55 cm; and
an impact resistant layer attached to a surface of the nonwoven substrate opposite the film layer, the impact resistant layer comprising fabric having at least two pluralities of intersecting strands that extend in different directions with respect to each other, wherein the impact resistant layer has a tensile strength of at least 445 Newtons and an elongation that is less than 10 percent and an Impact Resistance as measured by the Free-Falling Dart Method of greater than about 2pounds, and wherein the strands of the impact resistant layer comprise fiberglass.

20. The sheet material of claim 19, wherein the sheet material when applied to a wall structure is able to successfully withstand an impact from a projectile comprising a 9 pound, 7 foot two-by-four traveling at a speed of at least 34 miles per hour without penetration of the sheet material.

21. The sheet material of claim 19, wherein the impact resistant layer includes a first plurality of strands that extend in a first direction, a second plurality of strands that extend in a second direction that is different than the first direction, and third and fourth pluralities of strands that both extend at angle with respect to the first plurality of strands and are oriented at opposite angles with respect to each other so they intersect each other in an X-like pattern, and wherein the impact resistant layer has a tensile strength from about 600 to 1,200 Newtons.

22. The sheet material of claim 19, wherein the impact resistant layer is capable of sustaining an impact energy at least 65 ft-lbs/sec/in² resulting from an impact with a projectile without rupture of the sheet material or without permitting the projectile to penetrate through the impact resistant layer.

23. The sheet material of claim 19, wherein the sheet material has puncture strength from about 1500 to 7,500 psi, and a Mullen burst strength of about 175 pounds or greater.

24. The sheet material of claim 23, wherein the sheet material has puncture strength from about 3,000 to 5,000 psi.

25. The sheet material of claim 19, further comprising an adhesive material disposed between the impact resistant layer and the nonwoven substrate to thereby adhere the impact resistant layer to the nonwoven substrate.

26. An impact resistant wall structure comprising:
a plurality of spaced apart framing members;
a sheathing material mounted on an exterior side of the framing members; and
an impact resistant sheet material fastened to the exterior surface of the sheathing material, the impact resistant sheet material consisting essentially of a moisture vapor permeable, water-impermeable polymeric barrier layer having a hydrohead of at least 55 cm and a moisture vapor transmission rate of at least 35 $g/m^2$/day; and an impact resistant layer attached to the barrier layer, the impact resistant layer comprising a fabric layer having at least two pluralities of strands that extend in different directions and intersect each other, the impact resistant layer having a tensile strength of at least 445 Newtons, an elongation that is between 2 and 20 percent, and wherein the wall structure is able to successfully withstand an impact from a projectile comprising a 9 pound, 7 foot two-by-four traveling at a speed of at least 34 miles per hour without penetration of the wall structure, and wherein the strands of the impact resistant layer comprise fiberglass.

27. The wall structure of claim 26, wherein wherein the sheet material has a Mullen burst strength of at least 175 pounds and an Impact Resistance as measured by the Free-Falling Dart Method of greater than about 1 pound.

28. The wall structure of claim 26, wherein the sheet material has an Impact Resistance as measured by the Free-Falling Dart Method of greater than 2 pounds.

29. The wall structure of claim 26, wherein the sheet material is capable of passing the Large Missile Impact Resistance Test according to TAS 201-94, and the Cyclic Wind Pressure Loading Test according to TAS 203-94.

30. An impact resistant composite building panel consisting essentially of:
a substrate layer having an interior and exterior surface;
a moisture vapor permeable, water-impermeable, polymeric barrier layer having a hydrohead of at least 55 cm and a moisture vapor transmission rate of at least 35 $g/m^2$/day; and
an impact resistant layer disposed between the barrier layer and the substrate layer, the impact resistant layer comprising a fabric layer having at least two pluralities of strands that extend in different directions and intersect each other, the impact resistant layer having a tensile strength of at least 445 Newtons, an elongation that is between 2 and 20 percent, and an Impact Resistance as measured by the Free-Falling Dart Method of greater than about 0.7 pounds, wherein the substrate, barrier, and impact resistant layer are bonded to one another to from an impact resistant building panel that is able to successfully withstand an impact from a projectile comprising a 9 pound, 7 foot two-by-four traveling at a speed of at least 34 miles per hour without penetration of the building panel, and wherein the strands of the impact resistant layer comprise fiberglass.

31. The building panel of claim 30, wherein the substrate comprises
oriented strand board (OSB), plywood, gypsum board, fiber board, or polystyrene.

32. The building panel of claim 30, wherein the substrate is adhesively laminated to the impact resistant layer.

33. The building panel of claim 30, wherein the sheet material has an Impact Resistance as measured by the Free-Falling Dart Method of about 2 to 4 pounds.

34. The building panel of claim 30, wherein a wall structure employing the building panel is capable of passing the Large Missile Impact Resistance Test according to TAS 201-94, and the Cyclic Wind Pressure Loading Test according to TAS 203-94.

35. A safe room within a building structure that is constructed to provide shelter to occupants therein from being struck by wind-borne debris, the safe room comprising:
a plurality of walls disposed within the interior of building structure and being interconnected to one another to thereby define a room having an interior space; and
an impact resistant sheet material covering substantially all exterior surfaces of the walls, the impact resistant sheet material consisting essentially of a fibrous polymeric substrate and an impact resistant layer attached to a surface of the fibrous substrate, wherein the impact resistant layer comprises at least two pluralities of intersecting strands that extend in different directions with respect to each other, wherein the walls to which sheet material is able to successfully withstand an impact from a projectile comprising a 9 pound, 7 foot two-by-four traveling at a speed of at least 34 miles per hour without penetration of the sheet material so that wind-borne debris is prevented from penetrating through the walls of the safe room and striking the occupants therein, and wherein the strands of the impact resistant layer comprise fiberglass.

36. The safe room of claim 35, wherein the impact resistant layer has a tensile strength of at least 445 Newtons and an elongation that is between 2 and 20 percent.

37. The safe room of claim 35, wherein the safe room is disposed at a spaced-apart location from exterior walls of the building structure.

38. The safe room of claim 35, wherein the sheet material has an elongation that is less than 10 percent and an Impact Resistance as measured by the Free-Falling Dart Method of greater than about 2 pounds.

39. The safe room of claim 35, wherein the sheet material has puncture strength from about 1500 to 7,500 psi, and a Mullen burst strength of about 175 pounds or greater.

40. The impact resistant sheet material of claim 1, wherein the impact resistant layer has an elongation that is between 5 and 12%.

* * * * *